United States Patent [19]

King

[11] B 3,997,123

[45] Dec. 14, 1976

[54] AUTOMATIC CASSETTE LOADING MACHINE

[75] Inventor: James L. King, Sudbury, Mass.

[73] Assignee: King Instrument Corporation, Westboro, Mass.

[22] Filed: Dec. 23, 1974

[21] Appl. No.: 535,448

[44] Published under the second Trial Voluntary Protest Program on March 16, 1976 as document No. B 535,448.

[52] U.S. Cl. .............................. 242/56 R; 156/502; 242/58.4
[51] Int. Cl.[2] ........................................ B65H 19/20
[58] Field of Search ........... 242/56 R, 58.4, 67.3 R, 242/181, 199; 156/502, 506; 226/95

[56] References Cited

UNITED STATES PATENTS

| | | | |
|---|---|---|---|
| 3,637,153 | 1/1972 | King | 242/58.4 |
| 3,787,270 | 1/1974 | King | 242/56 R |
| 3,814,343 | 6/1974 | Bennett | 242/56 R |
| 3,825,461 | 7/1974 | Gorman | 242/56 R |
| 3,848,825 | 11/1974 | Zielke | 242/56 R |

*Primary Examiner*—Edward J. McCarthy
*Attorney, Agent, or Firm*—Schiller & Pandiscio

[57] ABSTRACT

A machine is provided for automatically loading empty cassettes one at a time with magnetic tape. Each empty cassette contains a leader. The machine comprises a magazine for storing a supply of empty cassettes, means for holding an empty cassette in a selected loading position below the magazine, means for withdrawing the leader from an empty cassette located at said loading position and positioning the withdrawn leader on a splicing block assembly, means for sequentially (a) severing the leader into two sections, (b) splicing one leader section to the leading end of a supply tape, (c) winding a selected length of said supply tape into the cassette, (d) severing the supply tape, (e) splicing the trailing end of the supply tape to the other leader section, and (f) winding the trailing end of the severed length of supply tape and the other leader section into the cassette, means for discharging a loaded cassette from the loading position and feeding another empty cassette to said loading position from the magazine, and means for sequentially and cyclically activating the foregoing means so that successive cassettes in the magazine are automatically loaded and discharged from the machine.

38 Claims, 16 Drawing Figures

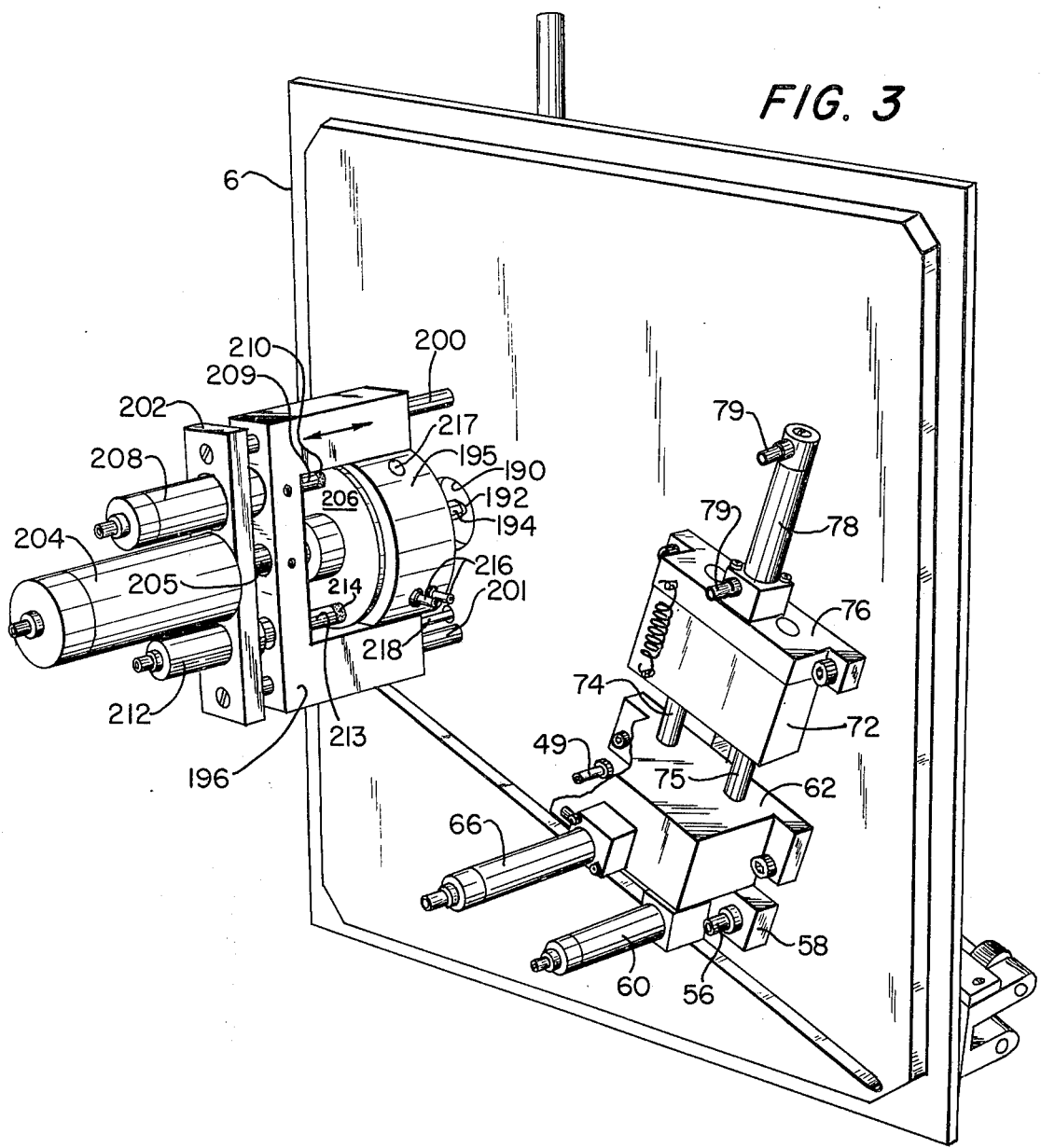

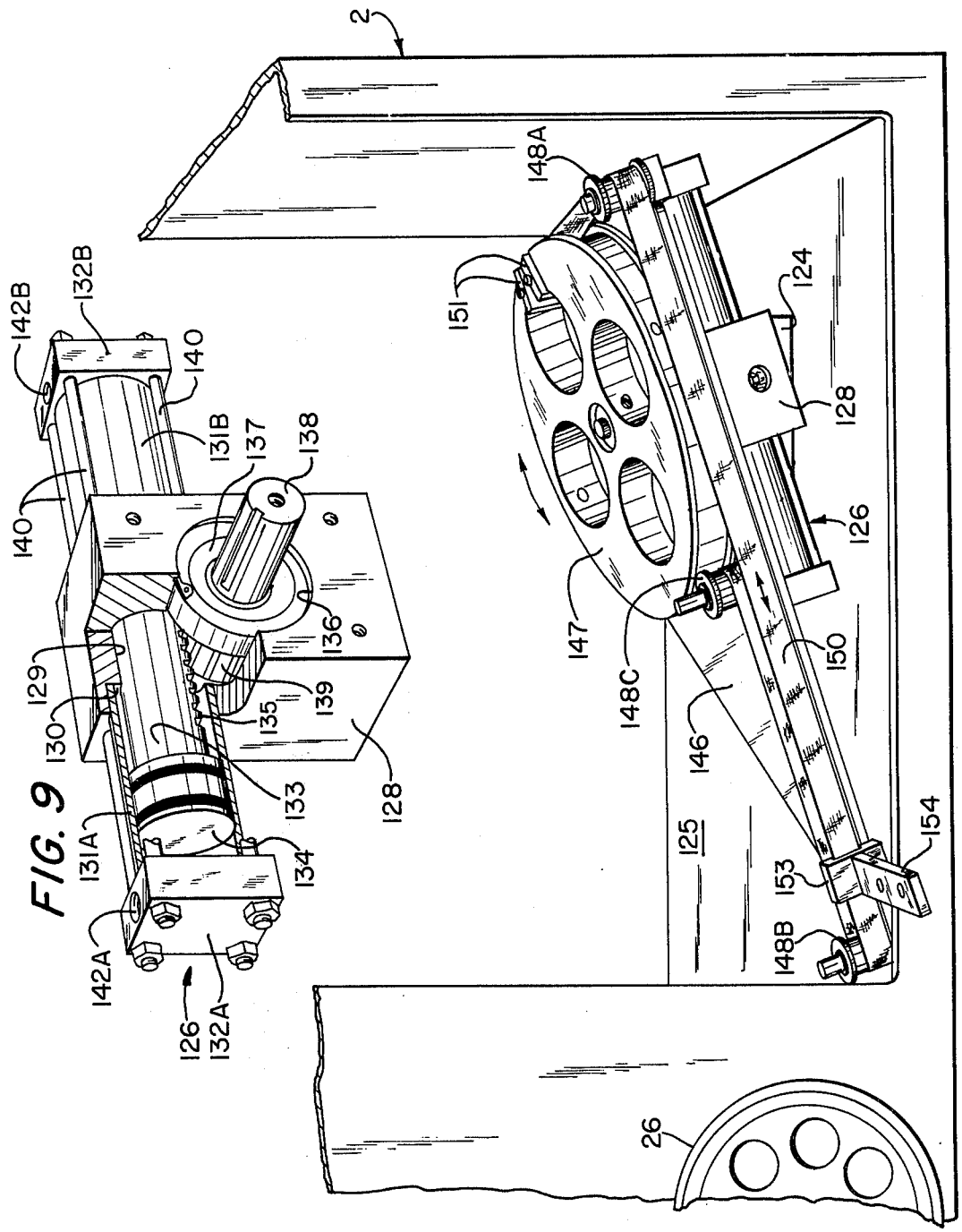

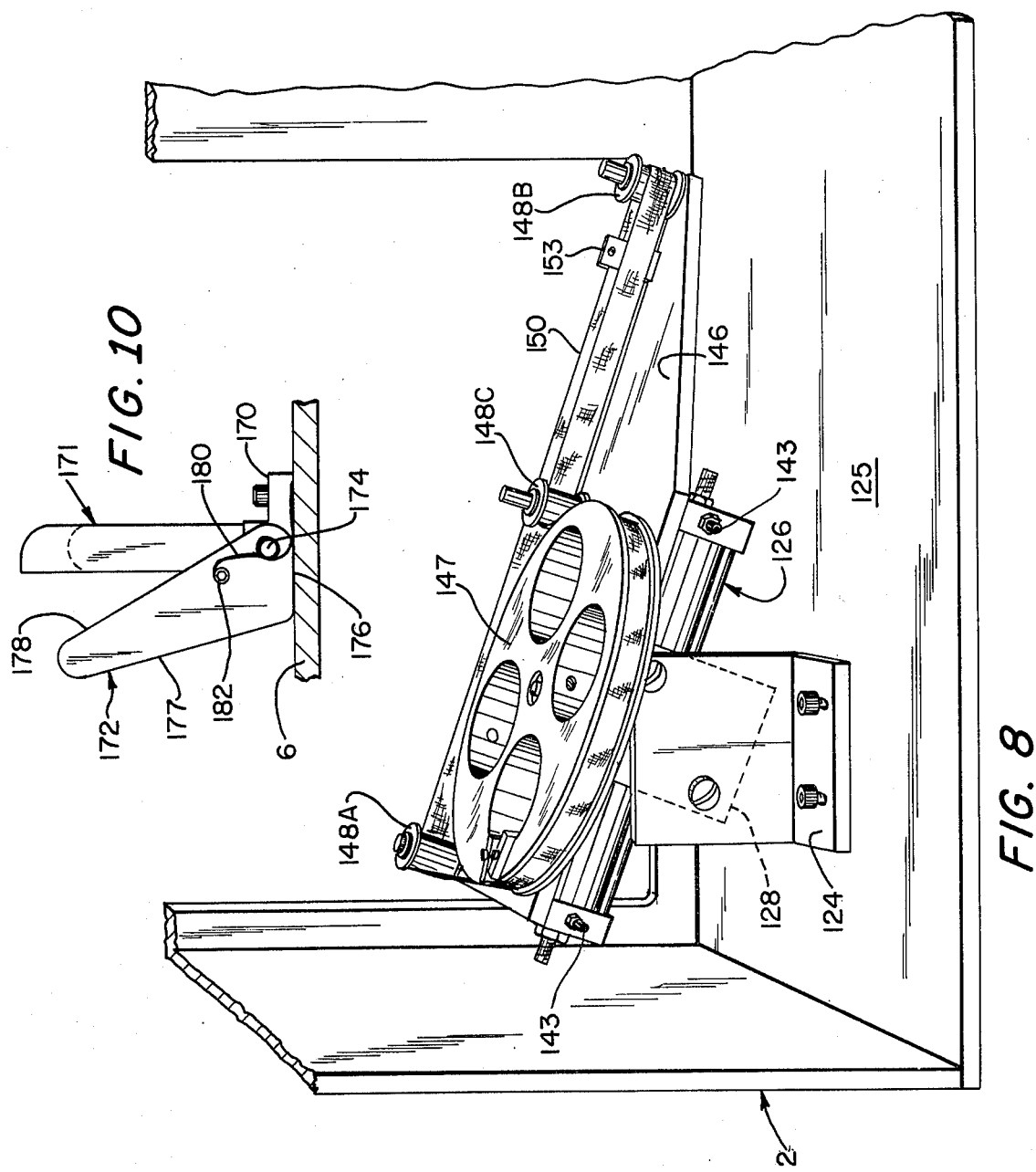

AUTOMATIC CASSETTE LOADING MACHINE

This invention relates to apparatus for splicing and winding tape and more particularly to apparatus for automatically loading tape into cassettes.

BACKGROUND OF THE INVENTION

Various types of machines are known for cutting, splicing and winding tape into cassettes. By way of example, my U.S. Pat. Nos. 3,637,153; 3,717,314; 3,737,358; 3,753,834; 3,753,835; and 3,787,270 disclose machines for loading magnetic tape into cassettes. Such machines comprise means for rotatably supporting a reel of supply tape, means for holding a blank cassette having two rotatable spools and a leader tape connected to the two spools, means for selectively rotating one of the spools, and cutting and splicing means for (a) cutting the leader tape into two sections, (b) splicing the end of one leader section to the leading end of the supply tape, (c) cutting the supply tape after a predetermined amount of such tape has been wound into the cassette, and (d) splicing the end of the other leader section to the trailing end of the supply tape that has been wound into the cassette. Additionally, some machines have been provided with means for ejecting the loaded cassette from its holder.

While such machines have gained great acceptance by the magnetic tape cassette industry, the rising cost of labor has created a demand for an improved cassette loading machine which avoids the need for an operator to (a) manually load an empty cassette into its holding means, (b) withdraw the leader from the cassette and properly place it upon the splicing block assembly, (c) remove the loaded cassette if no automatic ejection means is provided, and (d) initiate operation of the machine each time a new cassette has been inserted into the cassette holder with its leader withdrawn and placed on the splicing block assembly.

U.S. Pat. No. 3,814,343 issued to W. P. Bennett et al discloses a machine arranged to automatically load cassettes one at a time with magnetic tape. However, the Bennett et al machine utilizes a cassette receiver, which is movable bidirectionally in two different modes, for receiving cassettes one at a time from a cassette storage magazine and positioning the received cassette in a selected tape loading position. Such a receiver is costly, space consuming, and requires a complicated drive means for causing the receiver to move in either of two directions in each of its two possible modes of movement. A further limitation of the Bennet et al apparatus is that the leader withdrawal and positioning means and the splicing block are complicated, expensive, consume a large amount of space, and unduly increase the time required to carry out a complete cassette loading operation.

SUMMARY OF THE INVENTION

Therefore, the primary object of this invention is to provide a new and improved cassette loading apparatus whereby automatically and sequentially (1) blank cassettes are moved one at a time from a magazine to a loading position where the leader is automatically withdrawn, (2) the cassette is loaded with a selected amount of supply tape whose leading and trailing ends are spliced to the leader, and (3) the loaded cassette is ejected from the machine and replaced by a blank cassette.

A more specific object of this invention is to provide an automatic cassette loading machine which overcomes or avoids the limitations of the machine described in said Bennett et al patent.

Still another object of the invention is to provide a substantially fully automatic cassette loading machine whereby the operator is required merely to monitor and replenish the supply of blank, i.e. empty, cassettes, and the supply of magnetic tape with which the cassettes are to be loaded.

A further object of this invention is to provide a substantially fully automatic cassette loading machine wherein the leader is extracted from the blank cassettes by a leader extractor which utilizes only suction to withdraw the leader from the cassette and which is adapted to precisely and rapidly position the leader on the splicing block assembly.

Still another object is to provide a reciprocal leader extractor which is adapted to withdraw a leader from a blank cassette and automatically and precisely position the leader on a splicing block.

Another important object of the invention is to provide a cassette loading machine having novel means for feeding blank cassettes one at a time to a cassette loading station.

Further objects of the invention include a cassette loading machine which improves upon the machine disclosed in U.S. Pat. Nos. 3,637,153; 3,717,314; 3,737,358; and 3,753,834.

Still another object is to provide cassette loading machines which are sufficiently automatic and reliable as to permit one operator to monitor and replenish from about four to ten machines.

The foregoing and other objects hereinafter described or rendered obvious are achieved by a machine which comprises: a magazine for holding a supply of blank cassettes to be loaded, means for holding a blank cassette in a predetermined loading position and for discharging a loaded cassette from the aforesaid loading position; a splicing block assembly having first guide means for receiving a length of supply tape and second and third guide means for receiving the leader from an empty cassette, at least one portion of said splicing block assembly being movable between a first position in which the first guide means is aligned with the third guide means and a second position in which the second guide means is aligned with the third guide means, means for extracting the leader from a cassette located at said loading position and for positioning the extracted leader in the second and third guide means of the splicing block assembly when the latter is in its second position, means for severing the tape or leader on the splicing block assembly, splicing means for splicing the end of one portion of the leader to the leading end of the supply tape in the first position of the splicing block assembly and for splicing the end of another portion of the leader to the trailing end of the supply tape in the second position of the splicing block assembly, rotatable drive means for removably engaging at least one spool of a cassette located in said loading position and for rotating said at least one spool in a direction to wind supply tape into said cassette after its leading end has been spliced to said leader, means for operating and deactivating the drive means; and control means for sequentially and cyclically activating and deactivating the foregoing means to effectuate the continuous and sequential loading of empty cassettes.

Other features and advantages of the invention are described or rendered obvious by the following detailed description which is to be considered together with the accompanying drawings wherein:

FIG. 3 is a perspective view of some of the operating means on the rear side of the front panel of the machine of FIG. 1;

FIG. 6 is a longitudinal sectional view on an enlarged scale of a portion of the leader extractor;

FIGS. 7 and 8 are front and rear perspective views respectively of the drive for the leader extractor mechanism;

FIG. 9 is a perspective view, partly in section, of part of the drive of the leader extractor mechanism;

FIG. 10 is a bottom view of the leader diverter;

In the drawings, like numerals refer to like parts.

Figure 1:
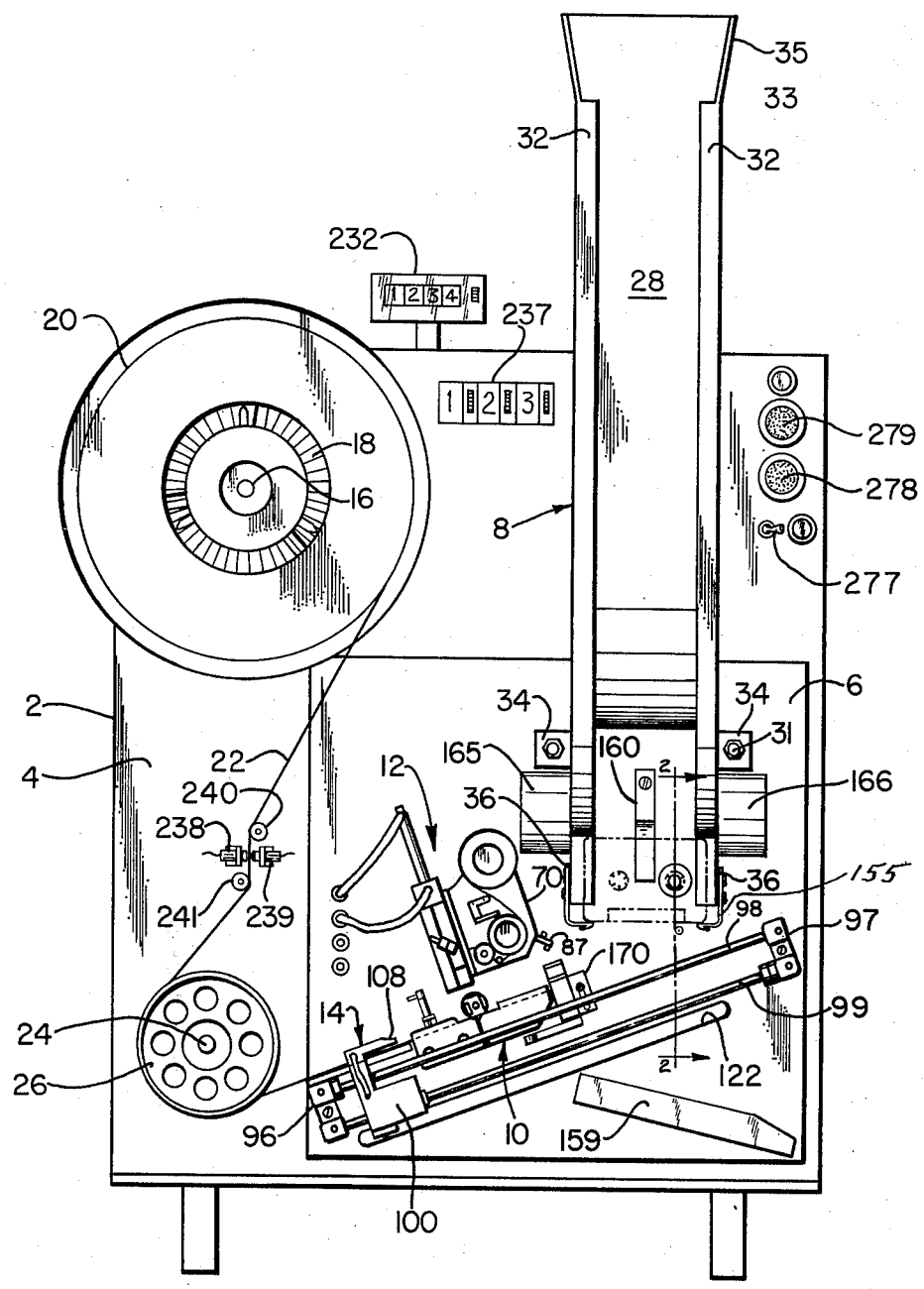
FIG. 1 is a front elevational view of a cassette loading machine comprising a preferred embodiment of the invention.
Figure 2:
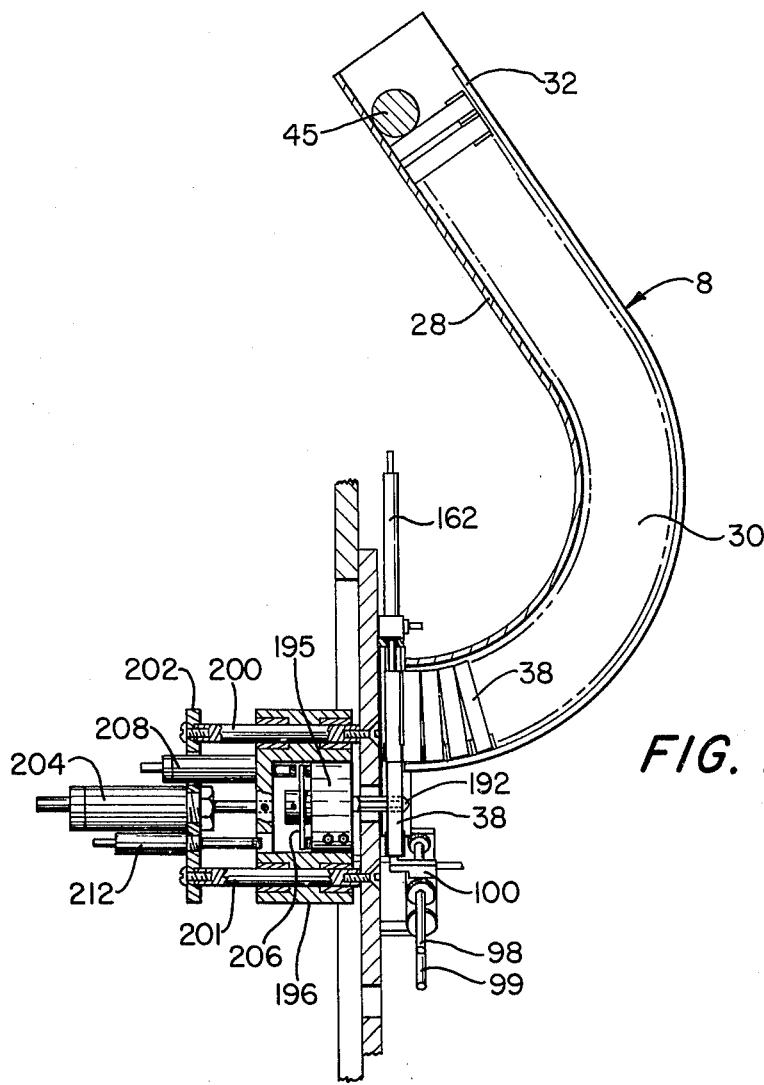
FIG. 2 is a sectional view taken to one side of the center line of the magazine.
Figure 5:
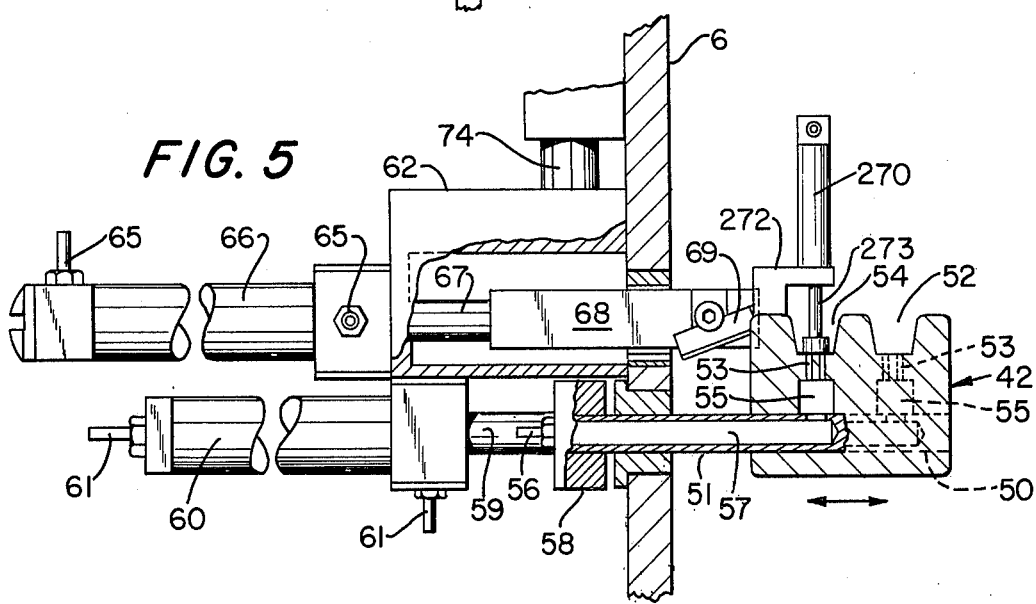
FIG. 5 is an enlarged cross-sectional view of the movable splicing block.

Referring now to FIG. 1, the illustrated machine comprises a housing 2 having a front panel 4 with a large opening that is closed off by a plate 6. The latter is removably secured to panel 4 by suitable means such as screws and serves as a support for a number of means including a blank cassette storage magazine 8, a splicing block assembly 10, a splicing tape dispenser applicator 12, and part of a leader extractor mechanism 14. Extending through front panel 4 are a rotatable supply reel shaft 16 to which is affixed a hub assembly 18 for supporting and driving a reel 20 of supply tape 22, and a rotatable shaft 24 to which is affixed a counting wheel 26.

Referring now to FIGS. 1, 2 and 4A–C, the magazine 8 is curved longitudinally and comprises a rear wall 28 and parallel side walls 30 with internal flanges 32 at their front edges. The bottom end of the magazine engages a pair of parallel cassette guide plates 36 that are secured to plate 6. The magazine has laterally extending ears 34 attached to its side walls 30 which receive screws 29 secured to plate 6 and engaged by nuts 31. The blank cassettes 38 which are stored in the magazine are generally of the type shown in FIG. 1 of my prior U.S. Pat. No. 3,637,153. Accordingly, the cassettes have relatively flat edges but their thickness is substantially greater along part of their front edge (the edge where the leader tape is exposed) than along their rear edge. The blank cassettes are loaded into the magazine so that their front edges face flanges 32. Since the cassettes are thicker along a substantial portion of their front edges, adjacent mutually engaging cassettes in the magazine are tilted with respect to one another. The rear and side walls of the magazine are dimensioned so that the cross-section of the channel which they define is slightly oversized with respect to the corresponding dimensions of the cassettes, whereby each cassette can assume substantially a right angle position with respect to rear wall 28 with enough clearance to allow the cassette to advance freely downward in the magazine. The longitudinal curvature of the magazine is set so that the bottom ends of rear wall 28 and flanges 32 extend almost perpendicular to plate 6 (see FIGS. 2 and 4B). Hence, as each cassette moves down in the magazine, its front edge will follow a curved path and the plane of the cassette will be substantially parallel to plate 6 as it moves out of the bottom end of the magazine. Flanges 32 extend toward each other far enough to retain the cassettes in the magazine and still leave an opening through which the cassettes may be observed and also engaged by the hand of the operator. The flanges 32 terminate short of the upper end of the magazine as shown at 33 in FIG. 1 and preferably the upper end of the magazine is flared as shown at 35 so as to facilitate insertion of additional cassettes as needed. The guides 36 extend below the lower end of the magazine (see FIG. 1) and function to direct cassettes from the magazine to a selected loading position. Guides 36 have a U-shaped cross-section with the channels 43 formed between their front and rear sections 35 and 37 being just deep enough and wide enough to slidably accommodate the opposite ends of a cassette. Front sections 35 have notches 39 in line with the end of the magazine. These notches are stepped to provide shoulders 41 to engage the lower ends of the rear side walls and also the flanges 32 of the magazine so that the magazine cannot protrude into the two channels 43, whereby cassettes can move one by one out of the magazine through notches 39 up against sections 37 and then can drop vertically along the channels formed by the two guides to a selected loading position as shown in phantom in FIG. 1. A weight in the form of a roller 45 may be disposed in the magazine to urge the cassettes to move downward. Additional means (hereinafter described) are provided for controlling movement of cassettes along guides 36.

The splicing block assembly 10 and splicing tape dispenser-applicator 12 are substantially the same as the corresponding units described and illustrated in my U.S. Pat. Nos. 3,737,358 and 3,753,835. Therefore, assembly 10 and dispenser-applicator 12 are described hereinafter only to the extent required to understand and appreciate the improvement provided by the present invention. In this case, the splicing block assembly and splicing tape dispenser-applicator are both mounted at an inclined angle to facilitate operation of the leader extractor mechanism.

Referring now to FIGS. 3, 4A–C and 5, the splicing block assembly comprises a stationary splicing block 40 affixed to plate 6 and a movable splicing block 42. The two blocks have mutually confronting flat end surfaces that are spaced from one another so as to form a narrow gap 44. The stationary block 40 has a flat upper surface in which is formed a single groove 46 (FIGS. 4A and B) which functions as a tape guideway. The base of the groove is flat and preferably its sides are slanted, and its base is provided with a series of small apertures (not shown) which are similar to aperture 53 described below and communicate through an interior passageway (not shown) in block 40 to a hose fitting 49 (FIG. 3) that is mounted in the rear side of block 40 and projects through the rear side of plate 6 (support block 62 hereinafter described is partially broken away in FIG. 3 to illustrate hose fitting 49). A hose (not shown) is connected to hose fitting 49 and extends to a source of vacuum through a suitable valve means hereinafter described. Thus, if tape 22 (or a leader tape as hereinafter described) is placed in groove 46 and vacuum is applied to splicing block 40 via the fitting 49, a suction force will be established which will hold the tape tight against the bottom of the groove.

The movable splicing block 42 is mounted on two parallel slide rods 50 and 51 (FIGS. 4A–C and 5) which are slidably disposed in openings in plate 6. The block 42 has a flat upper surface that is formed with two parallel grooves 52 and 54 which are identical in shape and extend parallel to the groove 46 of fixed splicing block 40. These grooves have a series of small apertures 53 formed in their bases whereby suction may be applied to tapes positioned in the two grooves. The movable block 42 is provided with two interior passageways 55 that communicate with the apertures 53 of grooves 52 and 54 respectively, and these passageways have ports that communicate with longitudinally extending bores 57 formed in the slide rods 50 and 51. Mounted in the rear ends of slide rods 50 and 51 are hose fittings 56 (FIGS. 3 and 5) which are connected through hoses (not shown) to a suitable source of vacuum through control valve means, hereinafter described, whereby suction may be selectively applied to hold down tapes located in grooves 52 and 54.

Figure 4A:
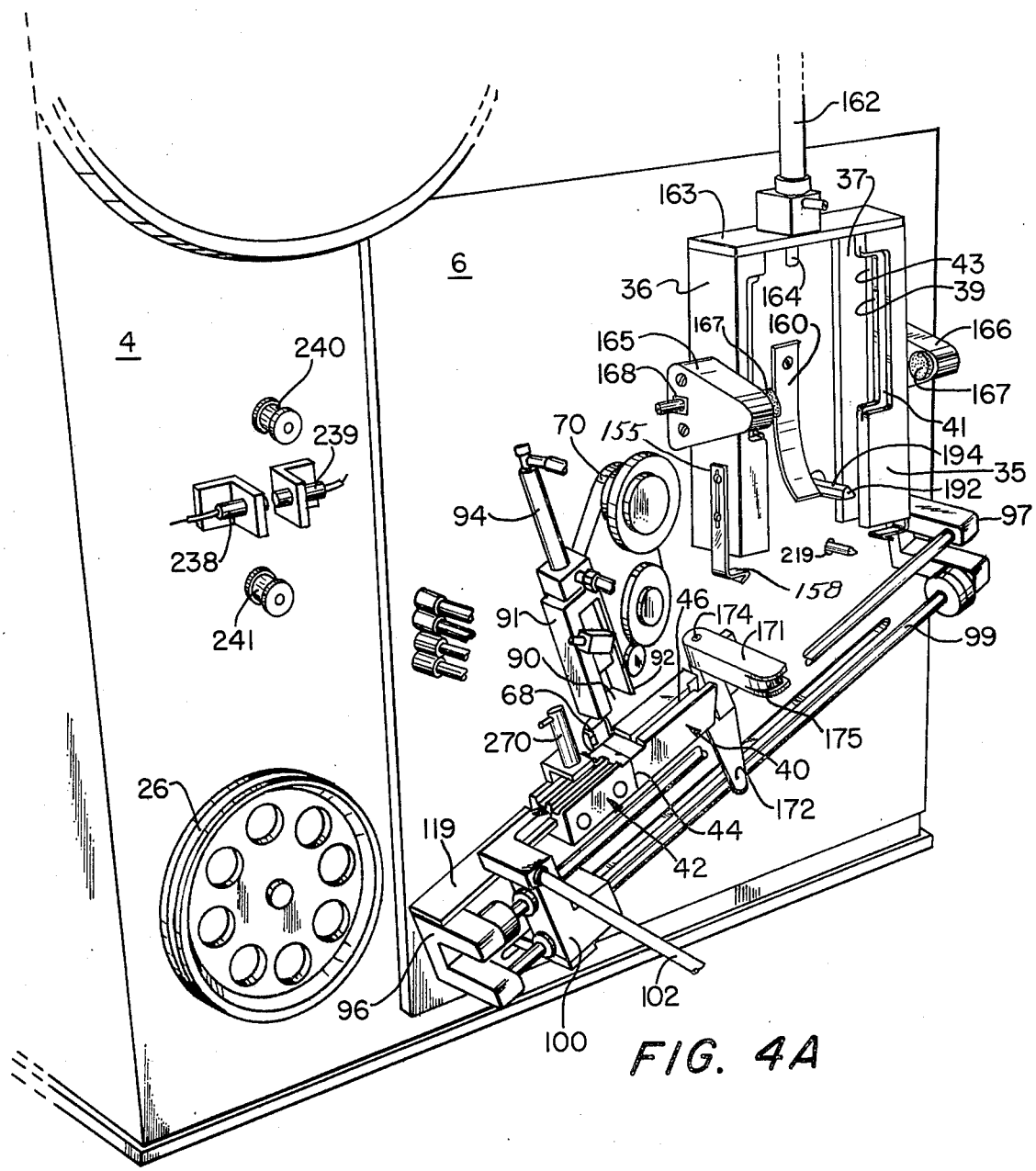
FIGS. 4A, 4B and 4C are enlarged perspective views of the splicing block assembly and leader extractor mechanism illustrating how a cassette leader is extracted from a cassette and positioned on the splicing block assembly.
Figure 4B:
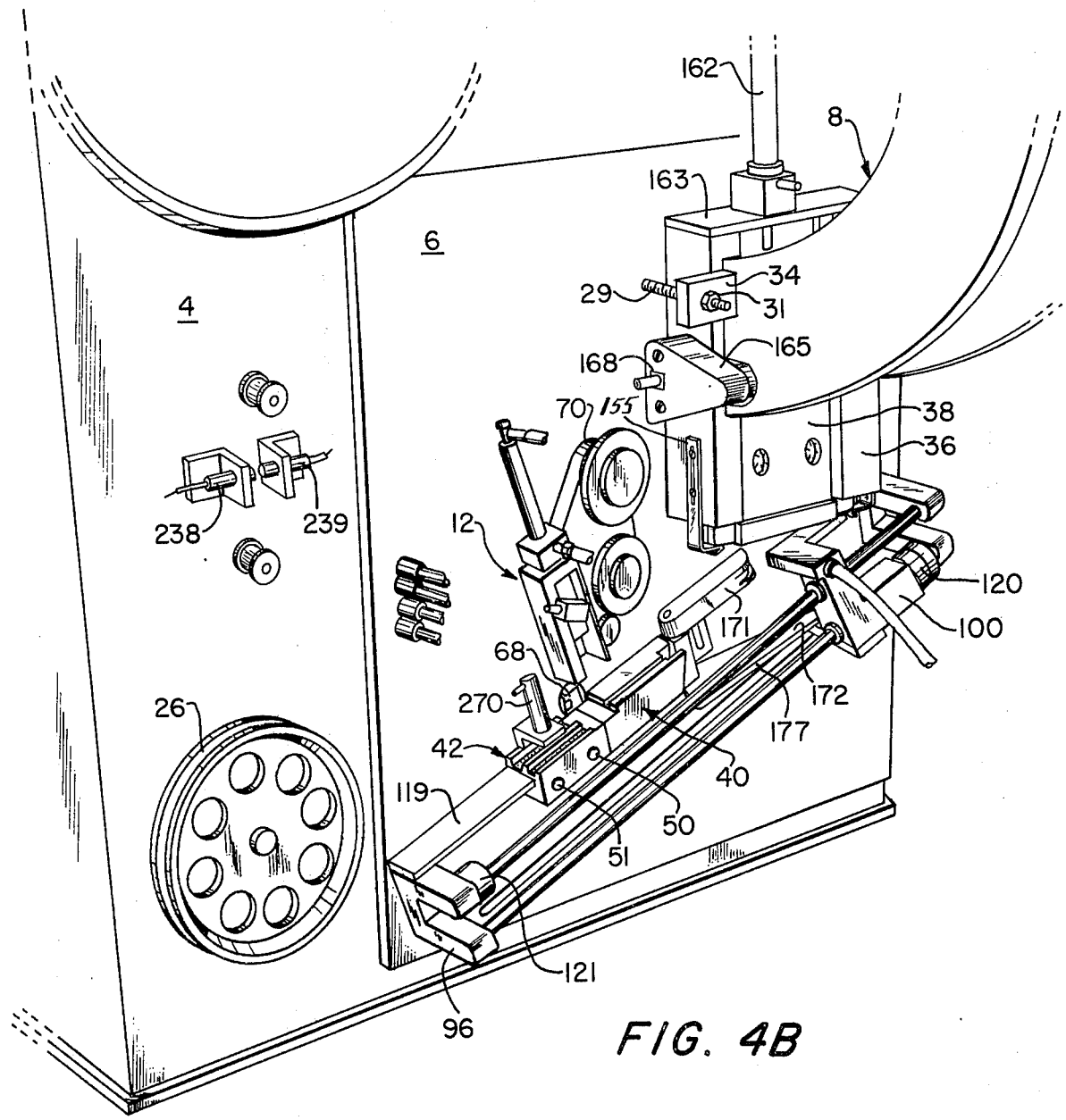
Figure 4C:
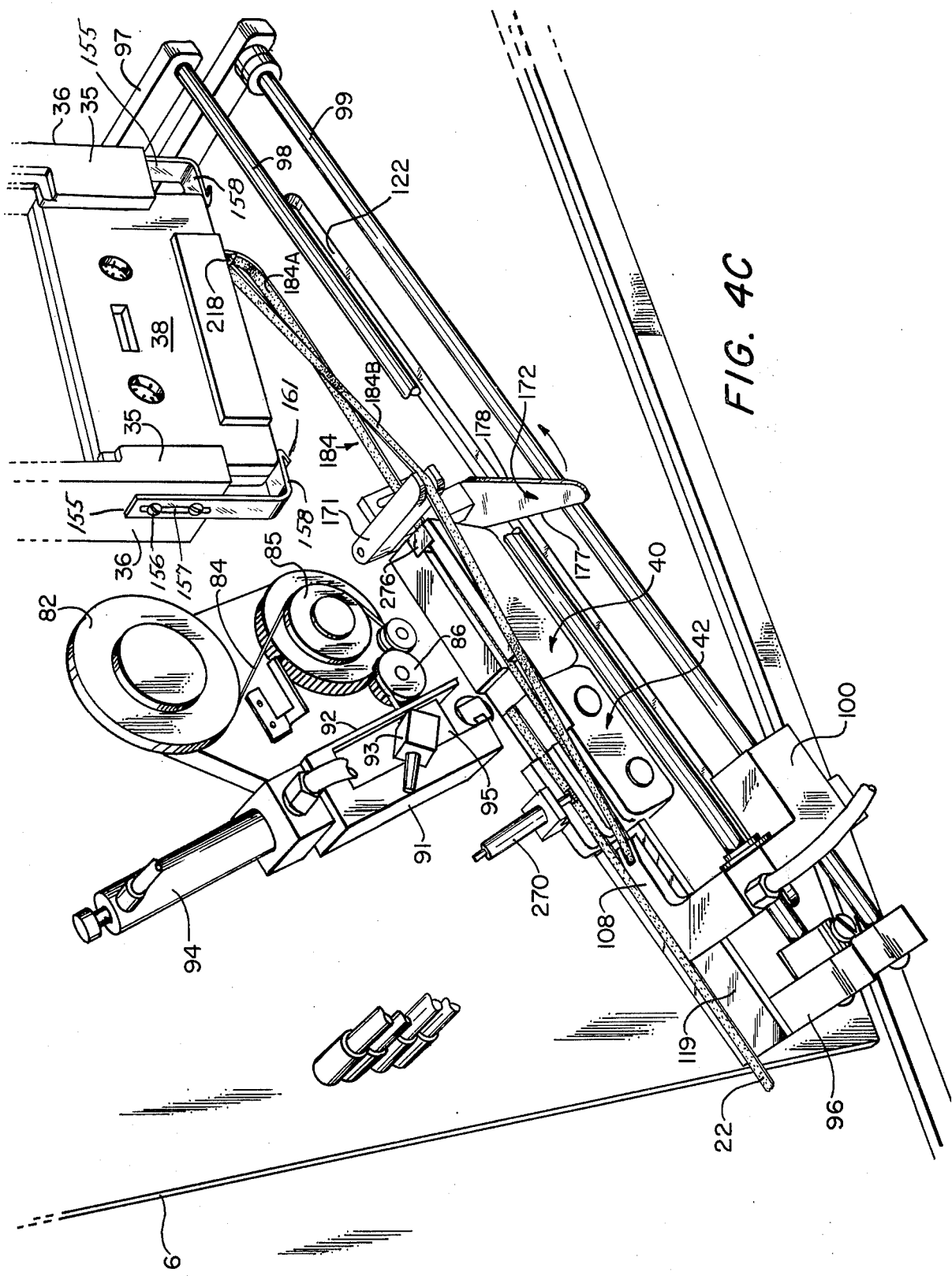

Operating means are provided for moving block 42 in and out relative to plate 6 so as to selectively align either of the grooves 52 and 54 with groove 46. The means for moving the movable splicing block 42 comprises a movable cross-block 58 (FIGS. 3 and 5) disposed behind plate 6 and attached to the piston rod 59 of a fluid actuator 60 which is secured to a large block 62 that is affixed to the rear side of plate 6. The rear ends of slide rods 50 and 51 extend through and are secured to crossblock 58. Actuator 60 is of the double-acting type, having inlets at the opposite ends of its cylinder which are provided with hose fittings 61 which are connected by means of hoses (not shown) and an appropriate control valve mechanism to a suitable source of pressurized air. When air is supplied to the front end of actuator 60, the actuator piston rod is retracted, moving the splicing block 42 up against the plate 6 so as to place its groove 52 into alignment with groove 46 (FIGS. 4A–C). When air is applied to the rear end of actuator 60, its piston rod is extended so as to move the splicing block 42 outwardly as in FIG. 5 so that its groove 54 is aligned with groove 46.

The machine also includes a knife mechanism which is similar to the knife mechanism shown in my U.S. Pat. No. 3,717,314 and forms part of the splicing head assembly. The knife mechanism comprises an actuator 66 (see FIGS. 3 and 5) of the double-acting type which is affixed to block 62. The piston rod 67 of actuator 66 extends through an oversized hole in block 62 and attached to its free end is an elongate cutter blade support arm 68 (see FIGS. 5 and 4A–C). The support arm 68 is aligned with an aperture in plate 6 and secured to its front end is a cutter blade 69. The cutter blade is mounted in line with the small gap 44 between the two splicing blocks 40 and 42, with its cutting edge facing down and preferably inclined as shown. When the piston rod of actuator 66 is fully retracted, arm 68 is withdrawn far enough so that the front end of the cutting blade will not interfere with movement of tape along the groove 46. When the piston rod of actuator 66 is extended, the cutter blade moves forward and its cutting edge slices through whatever tape is extending across from the groove 46 to one of the grooves 52 and 54. It is to be noted that the cylinder of actuator 66 is provided with hose fittings 65 at its opposite ends, whereby air admitted through one hose fitting will cause its piston rod to be extended and air admitted through the other hose fitting will cause its piston rod to be retracted.

The splicing tape dispensing and applicating unit 12 is adapted to apply a piece of adhesive-backed splicing tape to the abutting ends of two tapes supported by the two splicing blocks. Essentially, the unit 12 comprises a carriage plate 70 (see FIGS. 1 and 4A–C) that is attached to an arm (not shown) that extends through a slot in plate 6 and forms part of a slide block 72 (FIG. 3) that is slidably mounted on two slide rods 74 and 75 whose opposite ends are secured in block 62 mentioned previously and a second block 76 that is secured to the rear side of plate 6. Block 76 supports a double-acting fluid actuator 78 having hose fittings 79 at the opposite ends of its cylinder. Hoses (not shown) connect the two hose fittings of actuator 78 to a suitable supply of pressurized air through suitable valving mechanism hereinafter described. The piston rod (not shown) of actuator 78 extends through an oversized hole in block 76 and is secured to the slide block 72. Thus by suitable application of air to actuator 78, slide block 72 can be made to reciprocate up and down on slide rods 74 and 75, causing the carriage plate 70 to reciprocate in the same manner.

The carriage plate 70 is adapted to rotatably support a supply roll 82 of splicing tape 84 (see FIG. 4C) of the type having a pressure sensitive adhesive coating on one side thereof. The carriage plate 70 also carries a large feed roll 85 and a smaller feed roll 86 that are rotatably mounted to the carriage plate. Tape 84 passes around rolls 85 and 86 and means (not shown) are provided for holding tape 84 against roll 86. The splicing tape dispenser-applicator means also includes a drive means (not shown) which causes rolls 85 and 86 to rotate clockwise and counterclockwise respectively (as seen in FIG. 1) when the carriage plate is moved upwardly and which prevents rotation of the same rolls when the carriage plate moves downwardly. When the carriage plate moves upwardly, the rotation of rolls 85 and 86 causes a predetermined amount of splicing tape to be pulled off of supply roll 82. The drive means for rolls 85 and 86 includes and is actuated by movement of a crank arm 87 which projects radially of the axis of roll 85 and has its free end disposed between two pins affixed to plate 6. Crank arm 87 swings in one direction when carriage plate 70 moves down and in the opposite direction when carriage plate 70 moves up again.

The leading end of the splicing tape passes into and extends across a vertical channel 90 defined by two spaced parallel plates 91 and 92 that are attached to carriage plate 70. Plate 92 has a horizontal slit (not shown) for admitting the splicing tape to the guide channel 90. Attached to and supported by the upper ends of plates 91 and 92 is another fluid pressure actuator 94 of the double-acting type. Attached to the end of the piston rod of actuator 94 is a plunger 95 that is mounted between and guided by plates 91 and 92. The tape in channel 90 is drawn against the bottom end face of plunger 95 by suction applied via a hose fitting 93 that is attached to the plunger and communicates through an interior passageway (not shown) with a series of small holes (also not shown) in the plunger's end face. Plunger 95 carries a cutter (not shown) that slides along the inner face of plate 92 and is adapted to sever the tape 84 by a shearing action, thereby providing a severed section of splicing tape in the path of plunger 95. The tape severing action occurs when plunger 95 is driven downward in guide channel 90. The severed section of tape has a length approximately equal to the width of channel 90. Actuator 94 is operated when carriage plate 70 has moved down far enough so that the bottom edges of plates 91 and 92 are close to or lightly engage the splicing blocks. The severed section of splicing tape is driven downward by plunger 95 onto the two splicing blocks 40 and 42 in line with groove 46. When the carriage plate 70 moves up again, splicing tape is again advanced into guide channel 90 by rolls 85 and 86 so that another section of splicing tape may be cut and applied on the next downward stroke of the carriage plate 70. Further details of the construction and mode of operation of the splicing tape dispenser-applicator are not provided herein since such details are not essential to an understanding of the invention and also since a detailed description of the unit is provided in my prior U.S. Pat. No. 3,753,835.

Referring now to FIGS. 1, 4A–C and 6–9, the leader extractor mechanism comprises a pair of U-shaped yokes 96 and 97 which are attached to the plate 6. Mounted to and extending between the yokes 96 and 97 are two parallel and vertically spaced slide rods 98 and 99 which slidably support a leader extractor carriage 100. The slide rods 98 and 99 are inclined so as to be parallel to the upper surfaces of splicing blocks 40 and 42, with the latter blocks being located between the slide rods and plate 6. Carriage 100 is formed with a hollow chamber 101 having a port to which is coupled a flexible hose line 102 which leads to a vacuum pump (not shown) so that the chamber 101 may be subjected to a suction force. Carriage 100 also comprises a hollow finger 108 that has an opening 109 at its free end. The interior chamber 110 of finger 108 is defined by flat side surfaces (one of which is shown at 111 in FIG. 6), flat top and bottom surfaces 112 and 113 and a concave rear surface 114. At the free end of the finger the surfaces 112 and 113 are angulated upwardly as shown at 115 and 116, and the upper side is bevelled as shown at 117 so that opening 109 is inclined to the longitudinal axis of the finger. Chambers 101 and 110 are connected by a passageway 118 which intersects surface 114 as shown. The finger 108 extends parallel to the slide rods 98 and 99 and is disposed so that it is aligned with the groove 46 of splicing block 40. Additionally, finger 108 is elevated slightly above the level of the base of groove 52 so that it can move over the splicing blocks as it moves from its normal at-rest position (FIGS. 1 and 4A) to its leader extracting position (FIG. 4B). In the latter position finger 108 extends immediately beneath the front edge of a cassette 38 disposed in loading position between the lower ends of guides 36. A pair of collars 120 and 121 adjustably secured onto the lower and upper ends of slide rods 98 and 99 may be used to limit movement of carriage 100 along the slide rods. In such case collar 120 is located so as to stop the carriage when the free end of finger 108 is close to or lightly engages the cassette disposed in loading position between guides 36, and collar 121 is positioned to determine the at-rest position of carriage 100 between yoke 96 and splicing block 42. A plate 119 affixed to yoke 96 extends toward splicing block 42 below the level of finger 108. Plate 119 prevents the supply tape 22 from drooping down between yoke 96 and splicing block 42.

Movement of carriage 100 is accomplished by means of a drive mechanism which is illustrated in FIGS. 7-9. As seen in FIG. 1, an elongated slot 122 is formed in plate 6 below the level of and parallel to slide rod 99. This slot is to accommodate a portion of the drive mechanism hereinafter described which is coupled to the carriage 100.

Referring now to FIGS. 7 and 8, the drive mechanism for the leader extractor comprises an angle plate 124 which is attached to the bottom wall 125 of housing 2. Attached to and supported by angle plate 124 is a rotary actuator 126. The latter is disposed so that the longitudinal axis of its cylinder is inclined parallel to slot 122.

Actuator 126 is of conventional construction and comprises a block 128 which is attached to angle plate 124. Block 128 has a bore 129 of circular cross-section with each of the opposite ends of that bore being counterbored to form a shoulder 130. Disposed in the two counterbores and engaging shoulders 130 are two cylindrical tubes 131A and B. The inner ends of tubes 131A and B are open and their outer ends are closed off by headers 132A and B respectively. Disposed in bore 129 and tubes 131 is a piston rod 133 having a piston 134 (only one of which is shown) at each end. Piston rod 133 is formed with a plurality of teeth 135 along a major portion of its length, so that it can function as a gear rack. Block 128 has another bore 136 formed at a right angle and partially intersecting bore 129. Secured in bore 129 is a bearing assembly 137 that rotatably supports a shaft 138. Attached to the inner end of shaft 138 is a gear 139 whose teeth engage teeth 135 of piston rod 133. Tubes 131 are secured to block 128 by four tie rods 140 that are coupled to headers 132. Headers 132A and B are provided with like holes 142A and B respectively that communicate with and serve as ports for tubes 131A and B. Each hole 142 is threaded to receive a suitable hose fitting 143 for connecting the associated tube to a supply of compressed air via a hose line and a suitable control valve (not shown). The two tubes and the bore 129 in block 128 coact to form a pneumatic cylinder. If compressed air is supplied to one end of the cylinder via hole 142A and air pressure is relieved from the opposite end of the cylinder via the opposite hole 142B, the piston rod will be forced toward header 132B and shaft 138 will rotate in a first direction. If subsequently compressed air is supplied to the cylinder via hole 142B and the other end of the cylinder is vented via hole 142A, the piston rod will move toward header 132A and the shaft will turn in the opposite direction. In the absence of any exterior stop means such as collars 120 and 121, the limits of travel of the piston rods are determined by engagement of the two pistons 134 with headers 142A and 142B.

Attached to block 128 of actuator 126 is a flat plate 146 which is inclined parallel to slide rods 98 and 99. The front edge of plate 146 is straight and extends parallel to plate 6. Affixed to plate 146 are three stub shafts on which are rotatably mounted three idler pulleys 148A, B and C. Pulleys 148A and B are located near opposite ends of the front edge of plate 146 and pulley 148C is located between them but further away from the same edge of the plate. Shaft 138 extends through an oversized hole (not shown) in plate 146 and affixed to the shaft is a large wheel 147 having a flat groove formed along its circumference. The large wheel or pulley 147 is formed with a radial slot and the opposite ends of a flexible, non-stretchable belt 150 are secured in the radial slot by means of two anchor plates 151 that are attached to the wheel at opposite sides of the slot. Commencing at one end belt 150 extends in turn around a relatively large portion of the circumference of pulley 147 and around pulleys 148C and 148B, along the front edge of plate 146 to pulley 148A, around pulley 148A and back to pulley 147. Attached to belt 150 is a coupling member 153 which is formed with a rigid arm 154 that extends through slot 122 and is attached to the underside of carriage 100. The length of belt 150 and the angular position of pulley 147 on actuator shaft 138 are such that when piston rod 133 of actuator 136 is driven to one end of the actuator's cylinder, pulley 147 drives belt 150 in a direction to position arm 154 and carriage 100 as shown in FIGS. 1 and 7. When actuator 126 is operated so that piston rod 133 is moved to the other end of its cylinder, pulley 147 drives belt 150 in the opposite direction far enough for coupling member 153 to transport carriage 100 to the position shown in FIG. 4B.

Referring now to FIGS. 1, 3 and 4A–C, means are provided for releasably holding a blank cassette in position to be loaded. This particular means comprises a pair of spring clips 155 which are attached to the guides 36 by screws 156. The latter extend through slots 157 in the spring clips which are elongated so as to permit adjustment of the spacing between the lower ends of the guides and the lower ends of the spring clips. Each spring clip is bent so as to provide an inturned bottom portion or arm 158 that extends at substantially a right angle to the associated guide 36. The two arms 158 extend toward one another far enough for them to intercept opposite ends of a cassette 38 dropping down between the guides and support that cassette in the desired loading position at the bottom ends of the guides. The ends of arms 158 are bent so as to provide inclined lips 161.

The length of guides 36 below notches 39 is less than the height of a cassette and clips 155 are located so that the rear (i.e., upper) edge of the cassette which they support is slightly below the lower edges of notches 39. Thus, when a first cassette is supported by clips 155, a second cassette can be inserted in between the guides through notches 39 and this second cassette can rest on the first cassette. In accordance with this preferred embodiment of the invention, a positive means is employed (see actuator 162 in FIG. 4A) for forcing the second cassette to eject and replace the first cassette after the latter has been loaded. When the first cassette is forced downward by the second cassette, it causes arms 158 to bend downward so that further movement of the cassette will force the clips 155 to spread apart enough to release the first cassette. The clips 155 then spring back to their normal position to intercept the second cassette. A chute 159 (FIG. 1) attached to plate 6 catches the loaded cassette and diverts it to a suitable receptacle (not shown) located to the side of the machine.

However, although clips 155 spring back quickly, a finite amount of time is consumed in such return action. Therefore, movement of cassettes from the magazine to the desired loading position is required to be controlled so that when a loaded cassette is discharged, the next higher cassette cannot reach the loading position until after clips 155 have returned to cassette-intercepting position. In this connection it is to be noted that guides 36 are set so as to permit a cassette disposed between them to fall freely under the influence of gravity. However, a leaf spring element 160 is attached to plate 6 between guides 36. Spring element 160 is located and shaped so that it engages the rear side of a cassette as soon as the first (i.e., lower) edge of the cassette drops below the notches 39. The lower end of spring element 160 terminates a selected distance short of the lower ends of guides 36, so that it will engage a cassette held in loading position by clips 155 for a limited distance below its trailing edge, preferably for about one-half of the height of the cassette (i.e., the vertical dimensions of the cassette as seen in FIG. 1). Spring element 160 biases the cassette which it engages against the front sections 35 of guides 36 and thereby impedes downward movement of that cassette until the latter moves clear of it. Similarly, it will slow up downward movement of the next cassette as the latter is caused to move downward under the influence of actuator 162 hereinafter described.

The double-acting actuator 162 for positively ejecting a loaded cassette downward out from between guides 36 is mounted to a plate 163 extending across and attached to the upper ends of the guides. The actuator piston rod 164 extends through an oversized hole in plate 163. Actuator 162 is disposed so that its piston rod 164 is aligned with the rear (i.e., upper) edge of a cassette that is located between guides 36. The length of piston rod 164 is such that when it is retracted, it cannot impede movement of a cassette from the magazine into the channels 43 of guides 36. When piston rod 164 is extended, it will engage the second cassette located between guides 36 and force it to move down into loading position, thereby ejecting the first cassette. Piston rod 164 is extended immediately after the cassette loading operation has been completed as hereinafter described. Actuator 162 drives the second cassette at a controlled rate against the force of spring element 160, and as this occurs, the first cassette rapidly accelerates under gravity away from the second cassette as it moves free of the spring clips 155. As a consequence, ample time is afforded to permit clips 155 to snap back and stop the second cassette in the desired loading position. The inclined lips 161 of clips 155 assist discharge of the loaded cassette as the clips spring back to intercept the next cassette. Piston rod 164 is retracted immediately after it reaches the end of its extension stroke.

Means also are provided to assure that actuator 162 can operate without interference from the next cassette in the magazine (i.e., the third cassette counting the two disposed between guides 36) and also to assure that the second cassette will not get hung up on the next cassette. This particular means comprises two pneumatic brake units 165 and 166 attached to guides 36 on opposite sides of the magazine. These pneumatic units are of a type well known in the art. Each unit is essentially a singleacting actuator having a large circular brake pad 167 coupled to its piston. The brake pad is forced outwardly when air pressure is applied to the interior of the actuator via an inlet fitting 168 and is retracted by a spring within the unit when the air pressure is relieved. The brake pads of units 165 and 166 are located just in front of the guides and the opposite side walls 30 of the magazine are notched so as to permit the brake pads when extended to engage the bottommost cassette in the magazine and preferably also at least the next higher cassette, but not the second cassette which is between guides 36. When the brake pads are retracted, cassettes are free to move out of the magazine in between guides 36. When the brake pads are extended, the bottommost cassette in the magazine is held so as not to interfere with movement of the second cassette by the piston rod 164. The brake units are normally "off" and are turned "on" momentarily to allow piston rod 164 to drive the second cassette down and eject the loaded cassette from the machine. The brake units are turned off again as piston rod 164 is retracted so as to allow the third cassette to move into the position previously occupied by the second cassette.

A mechanism also is provided to assure that a leader extracted from a cassette in loading position and disposed on splicing blocks 40 and 42 will not interfere with the winding and splicing operations. This mechanism is shown in FIGS. 1, 4A–C and 10 and comprises a mounting plate 170 attached to front plate 6 and two arms 171 and 172 affixed to opposite ends of a shaft 174 that is rotatably journalled in mounting plate 170. Arm 172 functions as a leader diverter and has a notch 175 at its free end with a width that is greater than that of the leader. Preferably, the base of notch 175 is bevelled on both sides of arm 171. Arm 171 extends parallel to and is located above the level of the upper surface of splicing block 40. Arm 172 functions as a cam follower and is of generally triangular shape. It comprises a first short edge 176, a second longer edge 177, and a third still longer edge 178. The corners formed by edge 178 with edges 176 and 177 are preferably rounded and arm 172 is attached to shaft 174 adjacent the corner formed by edges 176 and 178. Arms 171 and 172 are displaced from one another about the axis of shaft 174 so that when arm 171 lies parallel to plate 6, the front edge 177 of arm 172 extends at a relatively shallow angle to plate 6. A spring 180 is wrapped around the bottom end of shaft 174 and one end of the spring is anchored to the underside of arm 172 by a screw 182. The other end of spring 180 extends between shaft 174 and plate 6 and bears against the latter. Spring 180 urges arms 171 and 172 to pivot clockwise (as seen in FIGS. 4A–C) away from plate 6 so as to place arm 172 in the path of travel of carriage 100. The limit of movement of arms 171 and 172 by spring 180 is determined by engagement of edge surface 176 with plate 6. When the carriage 100 is moved along slide rods 98 and 99 toward the cassette loading position, the carriage engages the outer edge 177 of arm 172 and cams it and arm 171 in toward plate 6 so that the full length of arm 171 is located between splicing block groove 46 and plate 6. Arm 172 remains engaged by carriage 100 until the carriage has moved past splicing block 42 back to its normal at-rest position. Accordingly, as the carriage undergoes its return stroke, the arm 171 pivots at a controlled rate away from plate 6. The angle of cam surface 177 relative to arm 171 is such that the notched end of arm 171 closely follows the free end of extractor finger 108 as carriage 10 undergoes its return stroke. If vacuum is applied to carriage 100, the resulting suction force at the end of finger 108 will extract the leader 184 from the cassette 38 when finger 108 nears the cassette at the cassette loading position and suck the leader into chamber 110 so that the leader forms a flat loop that adheres tightly to concave wall 114 and at least portions of upper and lower walls 112 and 113. As the carriage 100 undergoes its return stroke, the bottom part 184A of the leader loop is drawn over splicing blocks 40 and 42 and automatically positioned in grooves 46 and 52 (at this time splicing block 42 is retracted so that its groove 52 is aligned with groove 46). At the same time, the upper part 184B of the leader loop is engaged by the slotted end of arm 171 and is diverted forwardly of the splicing blocks as continued return movement of carriage 100 allows arm 171 to pivot away from plate 6. Thus when carriage 100 is back in its normal at-rest position, arm 171 holds the upper part 184B of the leader out far enough so that it will not interfere with operation of splicing tape applicator 12 or movement of tape along tracks 46 and 54 during the winding operation.

The mechanism for winding tape into an empty cassette will now be described. Referring to FIGS. 3 and 4A, an opening 190 is provided in mounting plate 6 between the lower ends of guide 36 to permit a drive spindle 192 to be engaged with a cassette hub. Drive spindle 192 is formed with teeth 194 (FIG. 3) for interlocking with mating teeth (not shown) on the inner peripheral surface of a cassette hub. Provision of teeth on cassette hubs so that the hubs may be driven by a complementary spindle is standard practice in the art as shown, for example, by my U.S. Pat. No. 3,637,153 and the Bennett et al U.S. Pat. No. 3,814,343. Drive spindle 192 forms part of the output shaft of an air turbine 195 whose housing is attached to a yoke 196 that is slidably mounted on two rigid slide rods 200 and 201 that are affixed at one end to mounting plate 6 and at the other end to a connecting plate 202. A doubleacting pneumatic actuator 204 is attached too plate 202. Piston rod 205 of actuator 204 extends through an oversized hole in plate 202 and is affixed to yoke 196. Actuator 204 is used to move turbine 195 toward and away from plate 6. When actuator 204 is operated so as to fully extend its piston rod, drive spindle 192 will project through opening 190 far enough for it to engage one of the hubs of a cassette located in loading position. When actuator 204 is operated in reverse, spindle 192 is retracted far enough to disengage itself from the same cassette and permit the cassette to be discharged from the machine. A brake disk 206 is affixed to the rear end of the output shaft of the turbine and a single-acting pneumatic brake actuator 208 is affixed to yoke 196. Plate 202 has an oversized hole to slidably accommodate the cylinder of actuator 208 so as not to interfere with movement of yoke 196. The piston rod 209 of actuator 208 extends through an oversized hole in the yoke and carries at its free end a brake pad 210 for engaging brake disk 206 when the piston rod is extended by application of pressurized air to the actuator. Another smaller single-acting pneumatic actuator 212 is attached to plate 202. The piston rod 213 of actuator 212 extends through an oversized hole in yoke 196 and has a brake pad 214 at its free end for engaging brake disk 206 when pressurized air is applied to the actuator. Actuator 212 and its pad 214 serve as a snubber to engage brake disk 206 when turbine 195 is retracted by operation of actuator 204. The housing of turbine 195 has two inlets 216 for application of pressurized air to drive its output shaft in a "forward" or "wind" direction and an outlet 217 for exhausting air from the turbine housing. One of the inlets 216 is used to operate the turbine at a high speed and the other inlet 216 is used to operate it at a slower speed. Further details of the construction of the air turbines are not believed necessary to an understanding of the present invention since such devices are well known and are disclosed, for example, in my U.S. Patents mentioned previously. Also if desired, air turbine 195 may be replaced by a two speed unidirectional electric motor.

Still referring to FIGS. 3 and 4A, a pin 218 is mounted in the front end of the lower leg of yoke 196. Pin 218 is located to one side of the turbine output shaft in line with an opening 219 located between the cassette-supporting arms 158 of spring clips 155. The length of pin 218 is such that it will not protrude through opening 219 except when yoke 196 is moved forward, and then pin 210 will extend beneath a cassette supported by clips 155 in position to separate the lower and upper portions 184A and B of the extracted leader. Yoke 196 is moved forward only after finger 108 has extracted a leader from the cassette disposed in loading position and carriage 100 has moved finger 108 back out from in front of opening 219, whereby pin 218 is prevented from striking finger 108.

Figure 11:
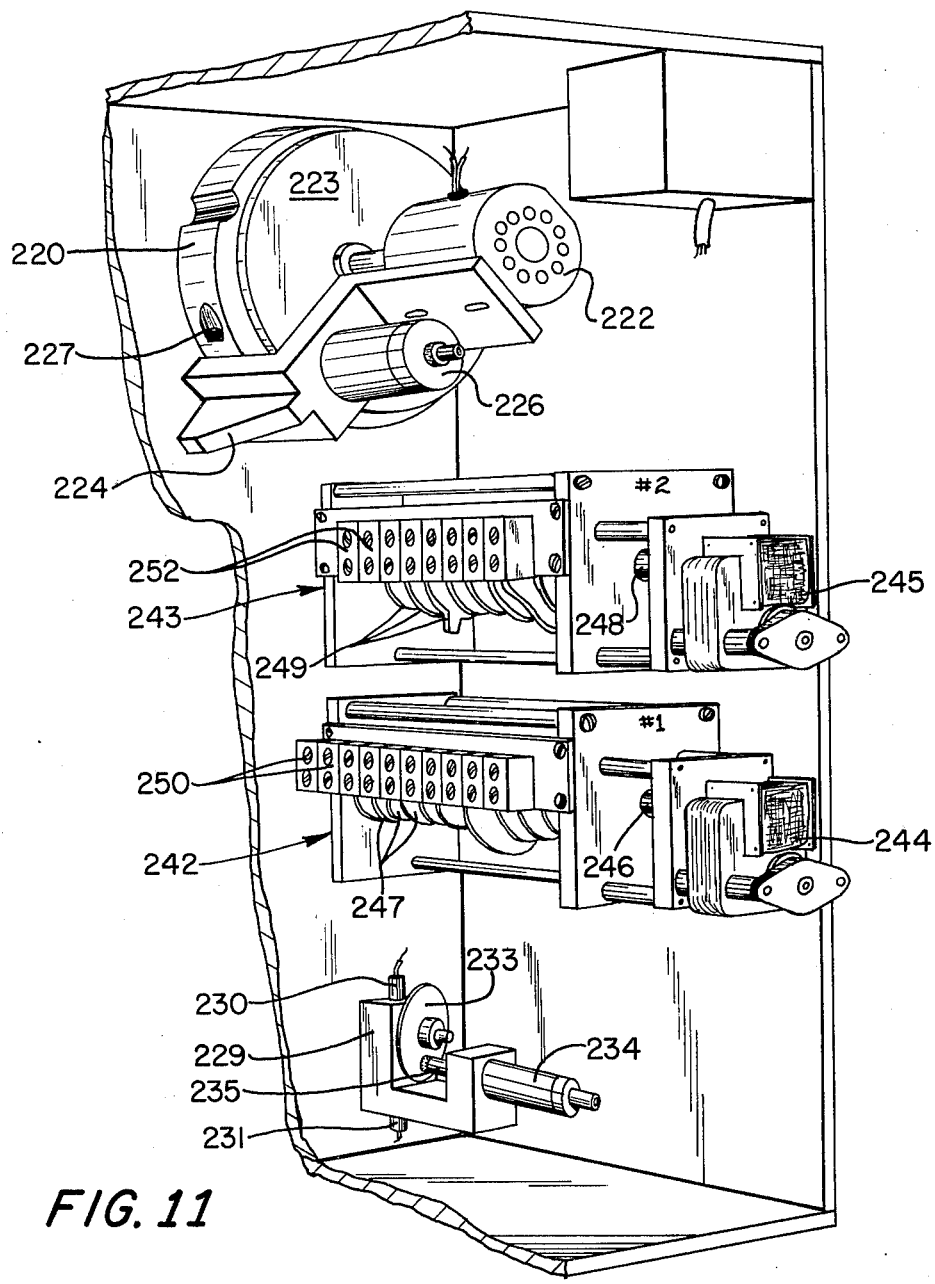
FIG. 11 is a perspective rear view of a portion of the machine.

Turning now to FIG. 11, the supply reel spindle 16 forms part of the output shaft of an air turbine 220 which is constructed substantially the same as but is larger than air turbine 195. The rear end of the output shaft of turbine 220 is coupled by a nonslip connection to the shaft of an electric motor 222, and a brake disk 223 is also mounted on and secured to the turbine's output shaft. Turbine 220 is attached to a supporting bracket 224 that is secured to the rear side of front panel 4. Also attached to bracket 224 is a single-acting pneumatic actuator 226 whose piston rod carries a brake pad (not shown) similar to brake pad 210. When actuator 226 is pressurized with air, its piston rod is extended to force its brake pad against brake disk 223 to stop the supply reel spindle. Turbine 220 has a slow speed "reverse" air inlet 227 whereby it may be driven in a direction to wind the supply tape onto the supply reel. Turbine 220 also has an exhaust port (not shown) for exhausting air from its housing. Motor 222 may be reversible but preferably it is unidirectional and is adapted to drive the supply reel spindle in the forward direction which is clockwise as seen in FIG. 1.

The counter wheel shaft 24 is rotatably supported in a block 229 attached to the rear side of front panel 4. Block 229 carries a light source 230 adapted to direct a light beam transversely of shaft 24 and a light detector 231 for detecting the light beam. Although not shown, it is to be understood that shaft 24 has a slot or transverse opening through which the light beam can reach light detector 231 only when the shaft reaches a particular angular position. Hence, detector 231 will produce a signal pulse once for each revolution of shaft 24 and, since the circumference of counter wheel 26 is fixed, the number of feet or centimeters of supply tape 22 transported from reel 20 can be determined by multiplying the number of signal pulses by the circumference of the counter wheel. In this case, however, the output pulses from detector 231 are fed to and counted by an electronic counter 232 (FIG. 1) of the type which can be programmed to produce an output control pulse and also to reset itself when the number of input pulses has reached a predetermined count. The use of a counting wheel and counter as above described is old in cassette loading machines and further details regarding the same are provided in my U.S. Pat. Nos. 3,717,314, 3,753,835 and 3,737,358. A brake disk 233 is attached to the rear end of counter wheel shaft 24 and a singleacting pneumatic actuator 234 carried by block 229 is disposed so that disk 233 can be engaged by a brake pad on the end of the actuator's piston rod 235 when pressurized air is applied to the actuator's cylinder.

Two additional control features are provided. One feature is a manually programmable counter 237 mounted to front panel 4. Counter 237 is provided to count the number of cassettes that are loaded by the machine and is preset to produce an output pulse when a predetermined number of cassettes have been loaded. Thus the input terminal of counter 237 is connected to switch 252D (FIG. 12) and indexes its count by one each time programmer No. 2 (hereinafter described) operates through a complete cycle. In practice, counter 237 is set so that its output pulse is generated when the amount of tape consumed in loading a predetermined number of cassettes is just shy of the amount of tape originally carried by supply reel 20. Counter 237 is particularly advantageous when the supply tape contains a number of pre-recorded "albums", in which case it is programmed to produce an output pulse when the number of cassettes that have been loaded equals the number of albums on the supply reel.

The other feature is an optical detector for detecting when the supply reel has been emptied. The detector comprises a light source 238 and a detector 239 mounted on front panel 4 between the supply reel and the counting wheel. A pair of idler rollers 240 and 241 mounted on front panel 4 serve to guide the tape in a straight line betwen light source 238 and detector 239. The latter produces an output control signal only when it receives light from source 238, which occurs when no supply tape is located between it and light source 235.

The outputs of counters 232 and 237 and detectors 231 and 239 are utilized by the control system of the machine as hereinafter described.

Turning again to FIG. 11, the machine also includes two programmers 242 and 243 which comprise electric motors 244 and 245 respectively. Attached to the output shaft 246 of motor 244 is a plurality of cams 247. Another plurality of cams 249 is attached to the output shaft 248 of motor 245. Programmer 242 also carries a plurality of electric switches 250 that are operated by cams 247. Programmer 243 also carries a plurality of electric switches 252 that are operated by cams 249. Programmers 242 and 243 form part of the control system shown in FIGS. 12-14 and hereinafter referred to as Programmer No. 1 and No. 2 respectively.

Figure 12:
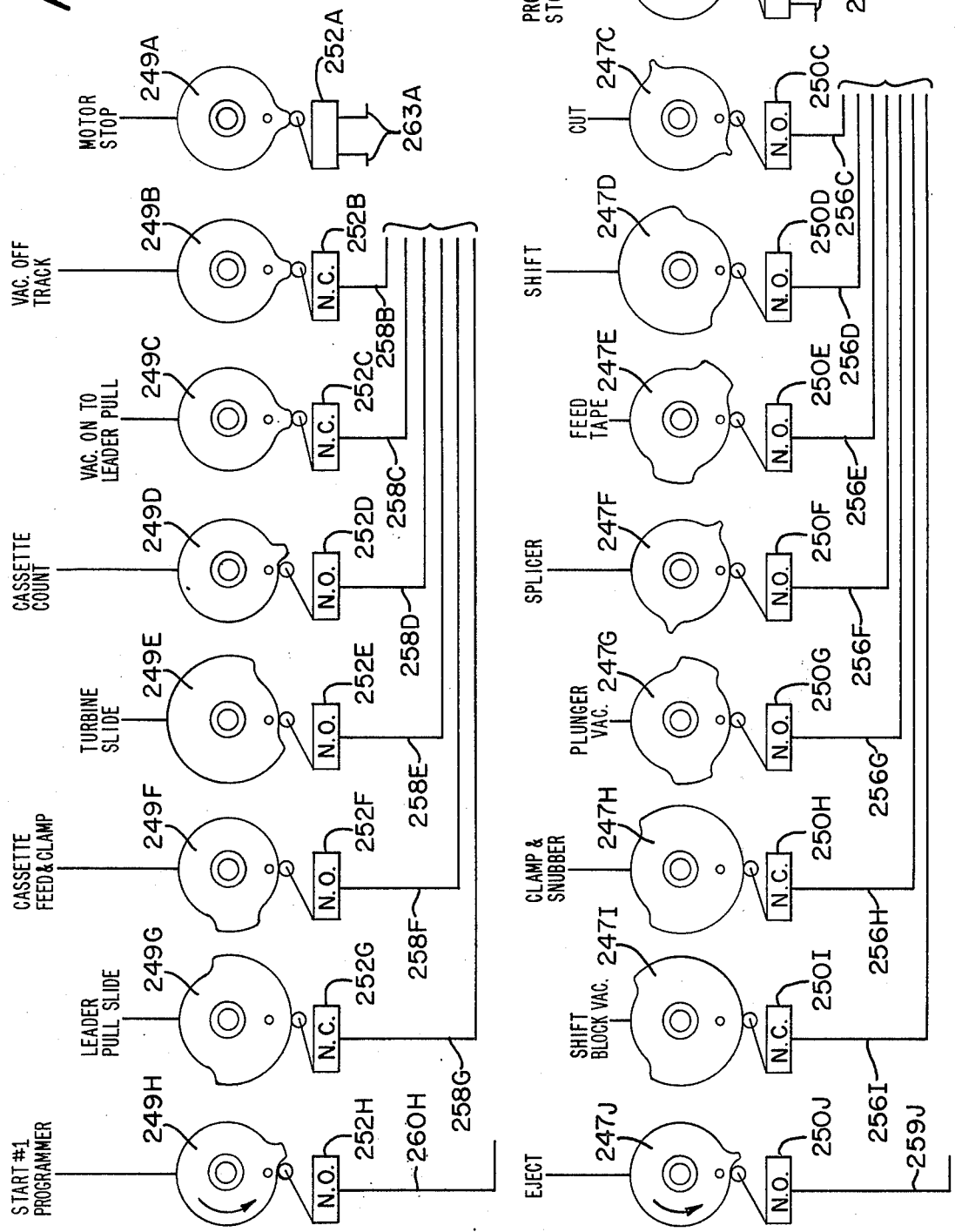
FIGS. 12, 13 and 14 are schematic diagrams of the control system of the machine.

Turning now to FIG. 12, programmer No. 1 has ten cams 247A-J and programmer No. 2 has eight cams 249A-H shaped as shown. FIG. 12 shows the positions of the cams of both programmers when the machine is in its START position. Additionally, FIG. 12 contains legend indicating the machine functions controlled by the various cams. Switches 250A, 250C-J and 252B-H are all single pole, single throw switches with switches 250A, C-G and J, and switches 252 D-F and E being normally open and the remainder being normally closed. Switches 250B and 252A are both single pole, double throw switches. Thus, when the machine is in its START position, switches 250H and I are held open by cams 247H and I respectively, and switches 252B, C and G are held open by cams 249B, C and G respectively. Also, switch 250B is held in a first state by one of the lobes of cam 247B and switch 252A is held in a first state by the lobe of cam 249A. At this point, it is to be noted that programmer No. 2 operates once and goes through a compelte revolution each time the machine executes a complete cassette loading operation. Programmer No. 1 also undergoes a full revolution for each cassette loading operation, but it stops when its second lobe of cam 247B operates switch 250B, and then is turned on again by the control circuit hereinafter described after a predetermined amount of supply tape has been wound into the cassette. Programmer No. 1 stops again at the end of a complete revolution due to the first lobe of cam 247B reactivating switch 250B.

Figure 13:
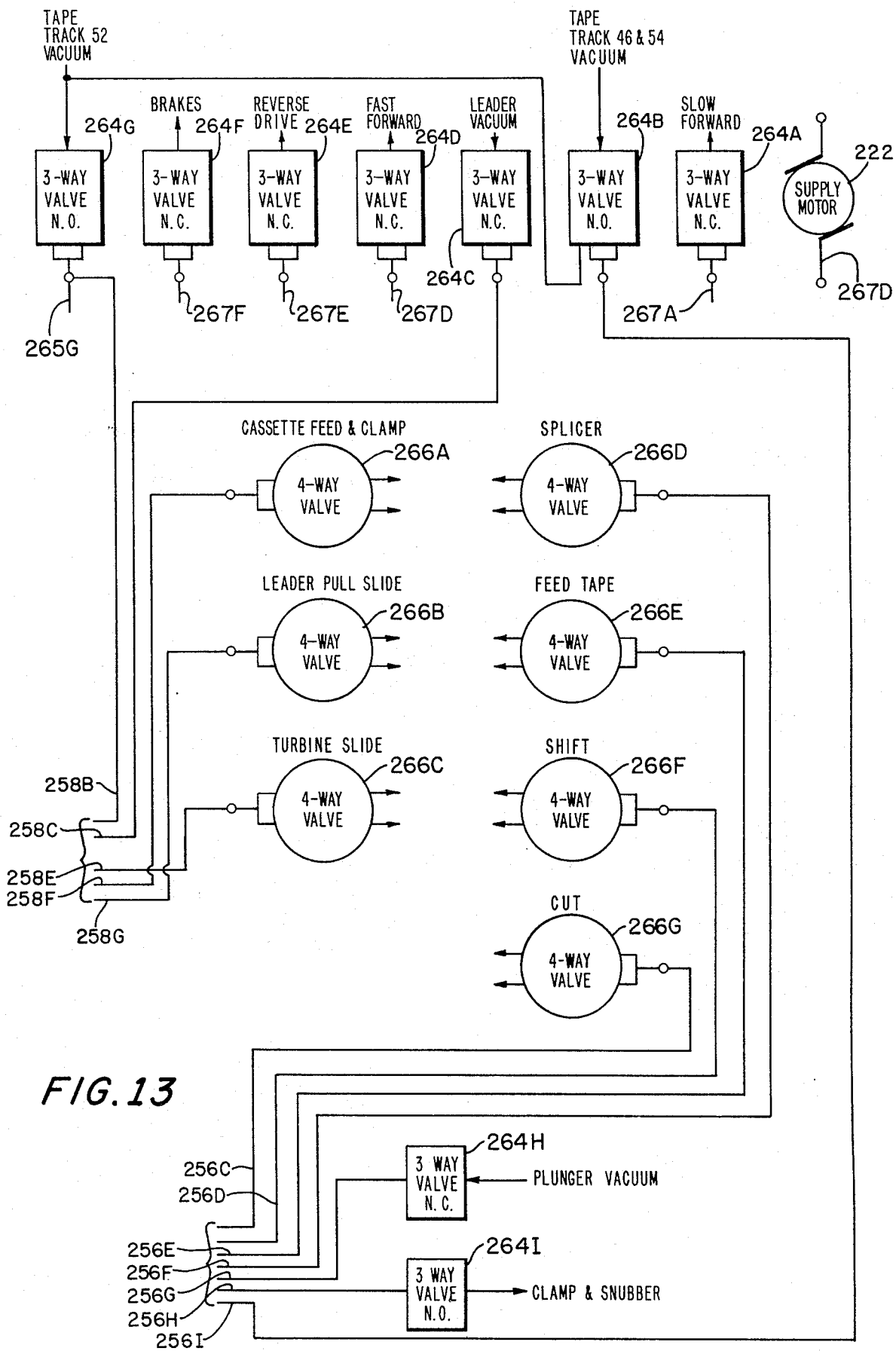
Figure 14:
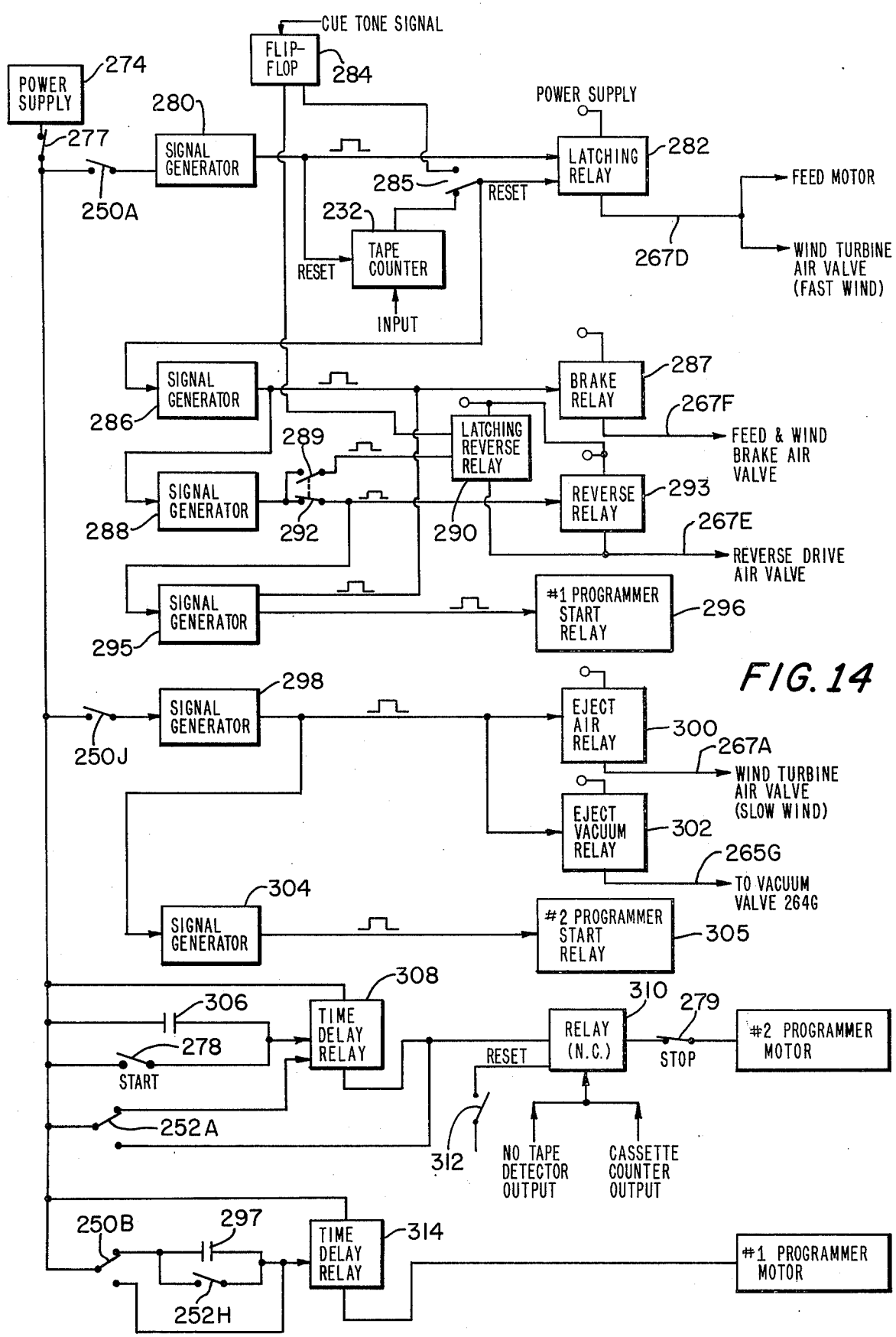

Switches 250A, B and J and switches 252A and H are connected to the electrical control circuit of FIG. 14, and switch 252D is connected to cassette counter 237, while the remaining switches are connected to selected ones of the solenoid valves shown in FIG. 13. To facilitate correlation, the connections between switches 250C-I and 252B, C and E-G and the solenoid valves are represented by lines 256C-I and 258B, C and E-G in FIGS. 12 and 13. Lines 259A and J and 260H represent connections of switches 250A and J and 252H to the control circuit of FIG. 14. Line 258D represents connection of switch 252D to counter 237. Switches 250B and 252A each have a pair of leads 262B and 263A respectively to indicate that they are double throw switches and are connected to the control circuit of FIG. 14.

Referring now to FIG. 13, the control system includes nine three-way solenoid valves 264A-I and seven four-way solenoid valves 266A-G. FIG. 13 contains legend indicating the machine functions controlled by the various valves. Although not shown in detail, it is to be understood that each three-way valve has a first exhaust port, a second supply port that is connected to a source of pressurized air or to a source of vacuum such as a vacuum pump, a third outlet port that is connected to apply air or vacuum as the case may be to a machine element, and a valve member which is adapted to selectively couple the third port (*a*) with the first port when the machine element is to be relieved of air or vacuum and (*b*) with the second port when air or vacuum is to be applied to the machine element.

In FIG. 13, each three-way valve 264 that is designated "N.C." has its output port closed off from its supply port when its solenoid is deenergized. Similarly, the designation "N.O." indicates that the output port is open to the supply port when the three-way valve is deenergized. Similarly, although not shown in detail, each four-way valve 266 is to be understood as comprising a first exhaust port, a second supply port that is connected to a supply of pressurized air, third and fourth outlet ports (represented by the two arrows) that are connected to opposite ends of a double-acting fluid actuator, and a valve member that is adapted to selectively and reversibly couple one outlet port with the exhaust port and the other outlet port with the supply port, whereby air is selectively applied to one end of the actuator and simultaneously air pressure is relieved from the other end of the same actuator. Each outlet port is deemed open when connected to the supply port and closed when connected to the exhaust port.

The solenoids of valves 264B, C and G-I and valves 266A-G are energized when the cam switches to which they are connected are closed by the corresponding cams. The solenoid of valve 264G is also adapted to be energized by a signal applied from the control circuit as represented by line 265G. The solenoids of valves 264A, D, E and F are adapted to be energized by signals applied from the control circuit as represented by lines 267A, D, E and F respectively.

The inlet ports of valves 264C, G and H are connected to a source of vacuum and the inlet port of valve 264B is connected to the outlet port of valve 264G. The outlet port of valve 264B is connected to guide tracks 46 and 54, while the outlet port of valve 264G is connected to tape guide track 52. The outlet port of valve 264C is connected to the leader extractor finger 108 via hose line 102 and the outlet port of valve 264H is connected to apply vacuum to plunger 95 via hose fitting 93.

The inlet ports of valves 264A, D, E, F and I are connected to a source of pressurized air. The outlet ports of valves 264A and D are connected to the "SLOW" and "FAST" input ports respectively of wind turbine 195. Valves 264A and D are arranged so that the former supplies air to turbine 195 at a slower rate than the latter, whereby the turbine can be made to run fast or slow according to which valve is opened. The outlet port of valve 264E is connected to the reverse drive input port of supply turbine 220 while the outlet port of valve 264F is connected to brake actuators 208 and 226 and counter wheel brake actuator 234. The outlet port of valve 264I is connected to brake snubber actuator 212 and also to a single-acting tape clamp actuator 270 (FIG. 5) which is mounted to a bracket 272 affixed to movable splicing block 42 and is disposed so that its piston rod 273 is aligned with guide track 54. The end of piston rod 273 is provided with a resilient pad for holding down a tape disposed in track 54.

The inlet ports of four-way valves 266A-G are all connected to a suitable source of pressurized air. The two outlet ports of valve 266A are connected to the opposite ends of cassette feed actuator 162 and the normally closed outlet of the same valve is also connected to the air inlets of cassette brake actuators 165 and 166. The two outlet ports of valve 266B and 266C are connected to the opposite ends of extractor mechanism actuator 126 and turbine slide actuator 204 respectively. The two outlet ports of valves 266D and E are connected to the opposite ends of actuators 78 and 94 respectively of splicing tape dispenser-applicator 12. The two outlet ports of valves 266F and G are connected to the opposite ends of splicing block shift actuator 60 and knife actuator 66 respectively.

When the machine is in its START position, (1) vacuum is applied by valves 264B and G to guide tracks 46, 52 and 54; (2) no vacuum is applied by valves 264C and 264H to leader extractor finger 108 and plunger 95; (3) no air is supplied by valves 264A, D and E to turbines 195 and 220 or by valve 264F to the three brake actuators; (4) air is applied by valve 264I to tape clamp actuator 270 and snubber actuator 212; (5) valve 266A supplies air to the cassette feed actuator 162 so as to keep its piston rod retracted and exhausts air from both of the cassette brake actuators 165 and 166; (6) valves 266B and C supply air to actuators 126 and 204 respectively so as to maintain the leader extractor carriage in the position shown in FIG. 1 and the drive turbine 195 in its extended position; (7) valves 266D and E supply air to actuators 94 and 78 so as to maintain carriage 70 and plunger 95 in their elevated positions (see FIG. 4A); (8) valve 266F supplies air to actuator 60 so as to maintain splicing block 42 up against plate 6 as shown in FIG. 4A; and (9) valve 266G supplies air to actuator 66 so as to maintain the cutter blade in its retracted position.

The machine may be used to load cassettes with blank tape or with prerecorded tape. In the latter case, the supply tape carries a number of identical recordings, e.g., a series of identical music albums, which are spaced apart with a "Cue" signal recorded in the space between successive recordings. The Cue signal is employed in place of the output of counter 232 to stop wind turbine 195 and motor 222 when a full album has been wound into the cassette. For this purpose, a magnetic read head 276 is installed in the stationary splicing block 40 as shown in FIG. 4C to monitor the Cue signals and generate a control signal which causes the control circuit to stop the winding operation.

Turning now to FIGS. 1 and 14, an ON-OFF power toggle switch 277, a normally open push-button START switch 278, and a normally closed push-bottom EMERGENCY STOP switch 279 are mounted in front panel 4. One side of cam switch 250A is connected to a suitable power supply 274 via ON-OFF toggle switch 277, while its other side is connected to a signal generator 280. The output of generator 280 is applied to the reset terminal of footage counter 232 and also to the energizing terminal of a latching relay 282. The latter, when energized, completes an electric power circuit to energize supply reel drive motor 222 and the solenoid of air valve 264D. Relay 282 is reset by the output signal generated by counter 232 or by an output signal provided by a flip-flop 284 in response to detection of a Cue signal by read head 276. For this purpose, a double-throw switch 285 is provided with one of its two stationary contacts connected to the output terminal of counter 232 and its other stationary contact connected to the Q output terminal of flip-flop 284. The movable contact of switch 285 is connected to the reset terminal of relay 282 and also to the input or energizing terminal of a second signal generator 286 which has its output line connected to the energizing terminal of a brake relay 287. The latter (and also relays 293, 296, 300, 302, 305, 308 and 314 hereinafter described) is of the type that automatically resets itself when the signal on its energizing terminal is removed. Relay 287, when energized, connects power supply 274 to the solenoid of brake air valve 264F. The output line of signal generator 286 also is connected to the input terminal of a third signal generator 288. The latter has its output line connected by a first switch 289 to the energizing terminal of a latching reverse drive relay 290 and by a second switch 292 to the energizing terminal of a non-latching reverse drive relay 293. Switches 289 and 292 are ganged together with switch 285 so that switch 289 is open and switch 292 is closed when switch 285 is positioned to connect the output of counter 232 to the reset terminal or relay 282. Relays 290 and 293 are connected in parallel so that the solenoid of reverse drive air valve 264E is energized when either of them is actuated by the output of generator 288. Relay 290 has its reset terminal connected to the Q output terminal of flip-flop 284 so that it will unlatch when the Q flip-flop output terminal goes high. The output line of signal generator 288 is connected to the input line of a fourth signal generator 295 which has its output line connected to the energizing input line of a non-latching relay 296 which is employed to start the No. 1 programmer. Relay 296 has a single set of normally open contacts 297 described hereinafter. An output line of signal generator 295 also is connected to the energizing line of brake relay 287.

Still referring to FIG. 12, one side of cam-operated switch 250J is connected to the power supply while the other side is connected to the input terminal of a fifth signal generator 298. The output line of signal generator 298 is connected to the energizing input terminals of a non-latching eject air relay 300 and a non-latching eject vacuum relay 302. These relays, when energized, complete electric power circuits to energize the solenoids of the slow wind air valve 264A and the eject vacuum valve 264G. Additionally the output terminal of signal generator 298 is connected to the input terminal of a sixth signal generator 304. The output of the latter generator is applied to the energizing terminal of a non-latching relay 305 which is employed to start the No. 2 programmer. Relay 305 has a single set of normally open contacts 306 described hereinafter.

Contacts 306 and start switch 278 are connected in parallel between the power supply and the energizing input terminal of a time delay relay 308. The latter is provided with a holding circuit which is connected to the normally closed stationary contact of cam switch 252A. The movable contact of switch 252A is connected to the power supply while its other normally open stationary contact is connected directly to the output line of relay 308. Relay 308 is actuated when start switch 278 or relay contacts 306 are closed, and remains energized through the normally closed contacts of switch 252A. When relay 308 is energized, it provides power to the motor of the No. 2 programmer, through the normally closed contacts of a latching relay 310 and EMERGENCY STOP switch 279. Relay 310 is adapted to open its contacts and be latched in that condition when an output signal is applied from the cassette counter 237 when a predetermined number of cassettes have been loaded, or alternatively when an output signal is provided by photodetector 239 which occurs when no tape is in position to interrupt the light beam from light source 238. It is reset when a reset signal is applied to its reset line by closing a manually operable push-button switch 312 which is mounted to the housing of the machine in a convenient location. Relay 308 is adapted to reverse states and interrupt current flow through its internal contacts to the motor of the No. 2 programmer a predetermined time after the movable contact of switch 252A changes position under the influence of cam 249A, whereby power continues to be applied to the No. 2 programmer motor through the second stationary contact of switch 252A.

Cam switch 250B has its movable contact connected to the power supply and its normally closed stationary contact connected to the input energizing terminal of a second time delay relay 314 through the normally open contacts 297 of relay 296 or alternatively through cam switch 252H which is connected in parallel with contacts 297. The normally open stationary contact of switch 250B is connected directly to the input energizing terminal of relay 314. When relay 314 is actuated by a signal applied to its energizing input line, it supplies power to the motor of the No. 1 programmer. Relay 314 is adapted to reopen its contacts a predetermined interval after its energizing circuit is interrupted as a consequence of switch 250B changing position. The time delay is sufficient to permit the programmer motor to remain in operation until the movable contact of switch 250B has completed the alternative current path to the motor through its normally open stationary contact.

Operation of the machine when it is under the control of tape counter 232 will now be described. For the purposes of this description, assume that the leading end of blank magnetic supply tape 22 is disposed in guide track 54 of the movable splicing block, and the machine is in its start position with wind turbine 195 in extended position, splicing block 42 retracted, vacuum applied to guide tracks 46, 52 and 54, and air supplied to clamp actuator 270 and snubber actuator 212, so that the tape in guide track 54 is held down by both the vacuum and the clamp actuator. Operation of the machine is commenced by closing start button switch 278. When this occurs, relay 308 is actuated to supply power to the motor of the No. 2 programmer. Relay 308 is held on through the holding circuit established through the normally closed contact of switch 252A as programmer No. 2 commences operating. Before relay 308 drops out, switch 252A reverses its position and thereby continues to supply power to the motor of the No. 2 programmer, whereby the programmer continues operating. Thereafter, cams 249B and C close switches 258B and C and thereby cause vacuum to be removed from tracks 46, 52 and 54 and applied to extractor finger 108. Immediately thereafter, switch 252E is closed so as to retract the wind turbine and then switch 252F closes to operate cassette feed actuator 162 and cassette brakes 165 and 166, whereby if a cassette is supported by clips 155 in loading position, it will be ejected and replaced by an empty cassette. Thereafter, wind turbine 195 remains retracted but the cassette feed actuator and brakes 165 and 166 are rapidly returned to their off positions and, as this occurs, cam 249G allows switch 252G to close, whereupon actuator 126 is caused to transport carriage 100 along the guide rails 98 and 99 far enough to locate the finger 108 immediately below the cassette which is supported by spring clips 155. As the finger 108 approaches the cassette supported on clips 155, the vacuum applied to the finger sucks the leader out of the supported cassette and into the chamber 110. Cam 249G reopens switch 252G as soon as finger 108 reaches the supported cassette, whereupon the carriage reverses its movement and returns to its original at-rest position. The leader that has been extracted from the cassette is held by finger 108 as the latter moves back over the aligned guide tracks 46 and 52 of splicing blocks 40 and 42. In this connection it is to be noted that in the usual empty cassette, the leader is wound partly on one hub and partly on the other hub and the amount wound on each hub will vary greatly. Therefore, the leader is not immovably clamped to the walls of cavity 110 of finger 108. Instead the vacuum applied to finger 108 allows the leader tape to slip along the walls of cavity 110 (similar to movement of an endless belt) with the direction of leader slip depending upon which cassette hub holds the major amount of tape, whereby finger 108 can continue to extract leader from the cassette for the full extent of its return stroke even after the leader has been fully pulled off of the hub holding the least amount of tape.

As the carriage 100 moves upwardly along slide rods 98 and 99, it engages cam follower plate 172 and forces it to pivot diverter finger 171 inwardly toward plate 6 out of the path of extractor finger 108. When carriage 100 undergoes its return stroke, it allows cam follower plate 172 to pivot outwardly again and, as it does so, diverter finger 171 engages the upper section 184B of the tape leader loop and moves it outwardly away from the splicing blocks as the lower section of the loop is placed in the guide tracks 46 and 52 by the extractor finger 108. As carriage 100 reaches its at-rest position, cam 249E reopens switch 252E so as to cause the wind turbine to move forward to engage its spindle with one of the hubs of the cassette supported on rods 158. At the same time, pin 218 enters between the two opposed portions of the withdrawn leader loop and maintains them apart from one another near the cassette. Thereafter, cams 249D and H momentarily close switches 252D and H. When this occurs, cassette counter 237 indexes one count and time delay relay 314 is actuated through the normally closed contact of switch 250B and the now closed contacts of switch 252H, thereby energizing the motor of the No. 1 programmer. Immediately thereafter, cams 249B and 249C reopen switches 252B and C and thus cause vacuum to be reapplied to guide tracks 46, 52 and 54 and removed from extractor finger 108 and cam 249A allows switch 252A to reverse and stop the No. 2 programmer.

Relay 314 remains on long enough after switch 252H is reopened to permit cam 247B to cause switch 250B to reverse states and thereby maintain relay 314 in actuated condition so that the motor of the No. 1 programmer will continue to operate. As soon as programmer No. 1 begins beings to operate, cam 247C closes switch 250C to briefly energize the solenoid of valve 266G, whereby the cutter severs the leader which is disposed along the guide tracks 46 and 52. Thereafter, cam 247D closes switch 250D to energize the solenoid of valve 266F. When this occurs, the movable splicing block 42 is moved outwardly so as to place the supply tape in track 54 in alignment with the leader section disposed in guide track 46. Then cam 247G closes switch 250G so that vacuum is applied to plunger 95. Next cam 247E closes switch 250E to cause the splicing tape dispenser-applicator carriage 70 to be moved down to the two splicing blocks. Then cam 247F closes switch 250F, whereupon plunger 95 is driven downward to apply a section of splicing tape to the abutting ends of the supply tape in track 54 and the leader section in track 46. Cam 247G reopens switch 250G to remove the vacuum from the plunger as the latter reaches the end of its downward stroke. Switch 250F is closed only momentarily, so that plunger 95 is quickly restored to its normal raised position. Cam 247E reopens switch 250E after plunger 95 is raised, whereupon carriage 70 is moved back up away from the splicing blocks. Thereafter, cams 247H and I allow switches 250H and I to close, whereupon valve 264I closes to release tape clamp actuator 270 and snubber actuator 212 and valve 264B closes to terminate vacuum to tracks 46 and 54. Then cam 247A momentarily closes switch 250A to trigger signal generator 280 and immediately thereafter cam 247B operates through its second lobe (the upper one shown in FIG. 12) to cause switch 250B to change states and revert back to the position shown in FIG. 14, whereupon programmer No. 1 immediately stops with the second lobe of cam 247B still engaging switch 250B.

When signal generator 280 is triggered by the momentary closing of switch 250A, it produces an output pulse of sufficient duration to energize and latch relay 282, whereupon the latter provides power to energize motor 222 and cause valve 264D to open and thereby operate wind turbine 195 in its high speed mode.

The output pulse from signal generator 280 also automatically resets tape counter 232. Latching relay 282 is maintained in a latched condition until it is reset by an output pulse from counter 232, which pulse is generated when a predetermined amount of supply tape has been wound into the cassette. Unlatching, i.e., resetting, of relay 282 results in shutting off motor 222 and closing off the supply of pressurized air to wind turbine 195.

The output pulse from tape counter 232 also triggers signal generator 286, whereupon the latter produces an output pulse of sufficient duration to cause brake relay 287 to momentarily energize brake valve 264F, whereupon the two turbine brake actuators and the counting wheel brake actuator are all operated to stop rotation of the supply tape shaft 16, wind spindle 129 and counter wheel 26. The output signal from generator 286 also triggers signal generator 288, causing the latter to produce an output pulse which energizes reverse relay 293 immediately after the three brake actuators are released. When this occurs, reverse drive air valve 264E is opened to supply air to the reverse drive inlet port of the feed turbine. Reverse relay 293 stays on for the duration of the signal pulse from generator 288, and thereafter it automatically resets itself so as to cause valve 264E to terminate the flow of air to the supply reel turbine. The output signal from generator 288 has a pulse width such that relay 293 will be on just long enough for the feed turbine to remove any slack in the supply tape between reel 20 and the cassette in loading position and assure that the supply tape is properly aligned with guide tracks 46 and 54 of the splicing blocks. The output from signal generator 288 also triggers signal generator 295, whereupon the latter produces an output pulse immediately after relay 293 has been reset. The output pulse of generator 295 is applied to brake relay 287 and is of sufficient duration to cause relay 287 to momentarily reapply the brakes to the supply and wind turbine shafts and also the counter wheel shaft as previously described.

The output pulse of signal generator 295 also momentarily actuates relay 296 so as to momentarily close its contacts 297. When this occurs, relay 314 is energized through the normally closed contact of switch 250B, thereby restarting the motor of the 1 programmer. Relay 314 stays on long enough after relay 296 has reset itself to allow cam 247B to shift switch 250B so as to provide a holding circuit for maintaining relay 314 in the energized condition, whereby the No. 1 programmer continues to operate.

When the No. 1 programmer restarts, the first thing that occurs is that cam 247I reopens switch 250I so that vacuum is restored to guide tracks 45 and 54 and cam 247H reopens switch 250H to reactuate snubber actuator 212 and tape clamp actuator 270. Then cam 247C closes switch 250C to operate the cutter, whereupon the supply tape extending along the tracks 54 and 46 is severed. Immediately after switch 250C reopens, cam 247D recloses switch 250D, whereupon valve 266F applies air to shift actuator 60 so as to cause the movable splicing block 42 to move inwardly again toward the plate 6 and thereby align its guide track 52 with guide track 46. As soon as the shifting block movement has been completed, cams 247G, E and F reclose and reopen switches 250G, 250E and 247F in the same sequence as previously described so as to cause the splicing tape dispenser applicator unit 12 to apply splicing tape to the abutting ends of the supply tape and leader section disposed in guide tracks 46 and 52 respectively. Thereafter, cam 247J closes switch 250J, with the result that signal generator 298 is triggered. Immediately thereafter, cam 247B shifts switch 250B back to its original state as shown in FIG. 14 to deactivate relay 314, whereupon the motor of No. 1 programmer is shut off.

When signal generator 298 is triggered by the closing of switch 250J, relays 300 and 302 are energized for a short period of time determined by the pulse width of the signal produced by generator 298. When relay 300 is energized, it energizes the solenoids of turbine valve 264A, whereupon the wind turbine is caused to move forward in its slow speed mode. Simultaneously, relay 302 causes eject vacuum valve 264G to shut off vacuum to the three tape guide tracks 46, 52 and 54 so that the supply tape and leader sections on guide tracks 46 and 52 are free to be wound into the cassette by the wind turbine. During this winding action, the leader section is pulled out from extractor finger 108 and wound into the cassette. Relays 300 and 302 are reset automatically when the output signal from generator 298 terminates, whereby the turbine stops and vacuum is restored to the three guide tracks. The output of generator 298 triggers signal generator 304 which in turn produces an output pulse which actuates programmer start relay 305 before relays 300 and 302 are reset. When relay 300 is actuated, its contacts 306 close to reactivate relay 308 and thereby restart the motor of the No. 2 programmer. Relay 308 is kept on after contacts 306 reopen due to its holding circuit being completed through the normally closed contacts of switch 250A.

The No. 2 programmer then operates through its complete cycle as previously described to cause the loaded cassette to be ejected and replaced by a new cassette and the leader of the new cassette to be extracted and positioned on guide tracks 46 and 52. As programmer No. 2 reaches the end of its cycle, cam 249H recloses switch 252H to restart the No. 1 programmer so that the new cassette will be loaded as just described. Thereafter the machine will continue to load successive cassettes automatically until the machine is shut off by operation of STOP switch 279 or release of relay 310 due to exhaustion of supply tape or an output signal from cassette counter 237 when a predetermined number of cassettes have been loaded. If desired, a normally closed switch may be mounted to the magazine and connected in series with STOP switch 239 so as to shut off the machine when the supply of blank cassettes has been exhausted.

If the supply tape to be loaded contains a number of prerecorded albums, switches 285, 289 and 292 are switched to render the control system responsive to Cue tones on the supply tape. In such case, when the Cue tone is sensed during the fast wind operation, flip-flop 284 will respond to the Cue tone signal and cause relay 282 to be unlatched to stop feed motor 222 and wind turbine 195. However, due to the high speed operation of wind turbine 195, the sensed Cue tone section of the supply tape will have been wound into the cassette before the brake actuators have stopped the wind turbine 195 and feed motor 222. However, switch 289 allows the output of signal generator 288 to actuate latching reverse relay 290 so that air will be supplied to the reverse drive inlet of supply turbine 220 until relay 290 is unlatched. The latter event occurs when enough tape has been backed out of the cassette for the previously sensed Cue tone to be sensed again by read head 276, at which point flip-flop 284 reverses states, whereby the signal appearing on its Q output line will unlatch relay 290 and thereby terminate the reverse wind operation. Turbine 220 operates at a relatively slow speed in the reverse direction so that relay 290 will unlatch and thereby stop the reverse wind operation while the sensed Cue tone section is over the splicing block assembly, with the result that on subsequent operation of programmer No. 1, the cutter will sever the supply tape at the sensed Cue tone section. Except for responding to the Cue tone signal, the control system otherwise will operate in the same manner as when it is set to respond to the output of tape counter 232.

Obviously the apparatus may be modified in various ways without departing from the principles of the invention. Thus, for example, cam 249D and switch 252D may be omitted and instead the input side of cassette counter 237 may be connected to switch 252E or F or switch 250J. Similarly, the two electro-mechanical programmers may be replaced by a digital electronic control system. Still other changes will be obvious to persons skilled in the art.

I claim:

1. An apparatus for automatically loading a plurality of cassettes having at least one rotatable spool and a leader attached to said spool with a predetermined length of tape comprising in combination:
   cassette holding means for releasably holding a cassette to be loaded in a predetermined loading position;
   means for storing a plurality of cassettes to be loaded and for advancing them one at a time to said loading position;
   means for feeding a supply of tape to be loaded;
   a splicing block means spaced from said loading position for supporting the leading end of the tape to be loaded and the leader of a cassette located at said loading position;
   reciprocally movable leader extractor means for withdrawing the leader from a cassette located at said loading position and positioning said leader on said splicing block means;
   splicing means for splicing the leading end of said tape to one section of the leader positioned on said splicing block means;
   rotatable drive means for rotating the spool of a cassette located at said loading position to wind a predetermined length of said tape on said spool;
   cutting means for severing the tape after a predetermined length thereof has been wound; and
   means for controlling operation of the foregoing means to effectuate the sequential loading of a plurality of cassettes.

2. Apparatus according to claim 1 wherein said cassette holding means holds a cassette in a selected plane, and said storage means comprises a magazine for containing a plurality of cassettes to be loaded, said magazine having a discharge opening at its bottom end and being arranged so that the bottommost cassette therein is disposed substantially in said selected plane.

3. Apparatus according to claim 2 wherein said loading position is located below said discharge opening.

4. Apparatus according to claim 3 further including means for ejecting a loaded cassette from said loading position.

5. Apparatus according to claim 3 including a panel supporting said magazine, and further wherein said cassette holding means is movable relative to said panel.

6. Apparatus according to claim 3 wherein said splicing block means is located below and to one side of said magazine, and said leader extractor means is mounted for movement between a first position in which it is located to one side of said splicing block means and a second position in which it is located adjacent to a cassette that is held at said loading position.

7. Apparatus according to claim 1 wherein said leader extractor means comprises a finger portion having a cavity for receiving a leader, means for coupling said cavity to a vacuum source to create a suction force to act upon a leader in a manner such as to cause the leader to be sucked into said cavity and to form a loop conforming in shape to the internal configuration of said cavity, and means supporting said leader extractor means for movement to and from said loading station.

8. Apparatus according to claim 7 wherein said means supporting said leader extractor means comprises at least one rail on which said leader extractor means is slidable.

9. Apparatus according to claim 8 further including means for reciprocating said leader extractor means on said at least one rail.

10. Apparatus according to claim 7 including means for selectively terminating said suction force.

11. Apparatus according to claim 7 wherein said finger portion is located in the same plane as a cassette located at said loading position.

12. Apparatus according to claim 1 wherein said means for storing a plurality of cassettes to be loaded and for advancing them one at a time to said loading station comprises a magazine for holding a plurality of cassettes to be loaded and cassette guide means for receiving cassettes one at a time from said magazine and guiding them to said loading position.

13. Apparatus according to claim 12 wherein said means for storing a plurality of cassettes to be loaded and for advancing them one at a time to said loading station comprises means for selectively stopping cassettes from moving from said magazine to said guide means.

14. Apparatus according to claim 13 wherein said guide means are located above said cassette holding means.

15. Apparatus according to claim 13 wherein said guide means comprises a pair of guides defining a channel for receiving cassettes from said magazine and directing them to said loading position.

16. Apparatus according to claim 15 wherein the length of said channel is sufficient for at least two cassettes to be disposed between said cassette holding means and the discharge end of said magazine.

17. Apparatus according to claim 16 further including means for advancing cassettes between said pair of guides to said loading position.

18. Apparatus according to claim 16 wherein said cassette holding means comprises a pair of spring clips extending below said guides.

19. Apparatus according to claim 16 wherein said means for advancing cassettes between said pair of guides is disposed adjacent to the discharge end of said magazine.

20. Apparatus according to claim 16 wherein said means for advancing cassettes between said pair of guides is adapted to move cassettes located between said pair of guides toward said cassette holding means.

21. Apparatus according to claim 16 further including means for promoting discharge of a loaded cassette from said loading position at a faster rate than cassettes are advanced along said channel from said magazine.

22. Apparatus according to claim 1 wherein said leader extractor means is adapted to move back and forth over said splicing block means.

23. Apparatus according to claim 22 including means for controlling movement of said leader extractor means in timed relation to advancement of a cassette to said loading position.

24. Apparatus according to claim 1 wherein said means for storing a plurality of cassettes to be loaded and for advancing them one at a time to said loading position comprises (a) a cassette storage magazine having a cassette discharge opening arranged so that cassettes are oriented vertically as they are discharged therefrom and (b) means for engaging a cassette discharged from said magazine and propelling the same downward to said cassette holding means.

25. Apparatus according to claim 1 wherein said cassette holding means comprises a pair of movable members adapted for intercepting and releasing cassettes advanced to said loading station.

26. Apparatus according to claim 1 wherein said splicing block means comprises a stationary block and a movable block, said stationary block having a first guide track for receiving a first portion of said leader, and said movable block having a second guide track for receiving the tape to be loaded and a third guide track for receiving a second portion of said leader.

27. Apparatus according to claim 26 wherein said movable block is movable to alternately shift one or the other of said second and third guide tracks into alignment with said first guide track.

28. Apparatus according to claim 27 including means for selectively applying vacuum to said first, second and third guide tracks.

29. Apparatus according to claim 27 wherein said leader extractor means is disposed so as to position the extracted leader along said first and second guide tracks when said first and second guide tracks are aligned with one another.

30. In combination with a machine for loading a selected supply tape into a cassette which includes a tape leader, said machine having cassette holding means for holding the cassette to be loaded, a splicing block assembly for supporting the leading end of the supply tape and the leader of the cassette to be loaded, and means for sequentially (a) severing the leader on the splicing block assembly into first and second leader sections, (b) splicing said first leader section to the leading end of the supply tape, (c) winding the first leader section and a predetermined length of the supply tape which is connected thereto into the cassette held by the cassette holding means (d) severing said supply tape at said splicing block assembly so as to form a trailing end for said predetermined length of supply tape, and (e) splicing said trailing end to the second leader section, the improvement comprising a leader extractor mechanism which includes a member which is adapted for reciprocal movement past said splicing block assembly toward and away from a cassette held by said cassette holding means, means for reciprocally moving said member, and means for connecting said member to a source of vacuum so that the leader is withdrawn from said cassette by suction and positioned on said splicing block assembly as said member is reciprocated toward and away from said cassette.

31. Apparatus according to claim 29 further including means for disconnecting said member from said source of vacuum after said leader has been positioned on said splicing block assembly.

32. A leader extractor mechanism for withdrawing a leader from a tape cassette located at a selected loading position and positioning said leader on a splicing block assembly comprising, a carriage movable back and forth along a selected path, a hollow member carried by said carriage and having an opening for accommodating a leader tape, and means for removing air from said hollow member so as to create a suction force at said opening for holding a tape leader to said member.

33. Apparatus according to claim 32 including means for moving said carriage back and forth along said path.

34. Apparatus according to claim 32 for terminating removal of air from said member when said carriage is in a selected position.

35. Method for automatically loading a cassette with a selected supply tape comprising the following steps:
advancing the cassette to be loaded from a magazine to a selected loading position, withdrawing the leader from the cassette by a suction device and moving the suction device with the leader so as to position the withdrawn leader upon a splicing block assembly which is displaced from said loading position, severing the leader on the splicing block assembly into first and second leader sections, attaching said first leader section to the leading end of a supply tape of idefinite length, winding said first leader section and the supply tape attached thereto into said cassette, terminating winding, severing said supply tape at a selected point so as to form a trailing end for the supply tape wound into the cassette, splicing said trailing end to the second leader section, winding said trailing end and said second leader section into said cassette, discharging said cassette from said loading position and replacing it with a second cassette, and automatically repeating the foregoing steps in order to effect loading of said second cassette.

36. A method according to claim 35 further including the step of reversing movement of said supply tape after winding has been terminated just long enough to remove any slack from said supply tape, and thereafter performing the steps of severing the supply tape and splicing it to the second leader section as previously described.

37. The method according to claim 35 wherein said suction device comprises a hollow member and said leader is extracted from said cassette and positioned on said splicing block assembly by sucking the leader into an opening in said hollow member under the influence of vacuum and moving said hollow member over and past said splicing block assembly.

38. A method according to claim 37 wherein the vacuum applied to said hollow member is relieved after said leader has been positioned on said splicing block assembly.

* * * * *

UNITED STATES PATENT OFFICE
CERTIFICATE OF CORRECTION

Patent No. 3,997,123          Dated December 14, 1976

Inventor(s) James L. King

It is certified that error appears in the above-identified patent and that said Letters Patent are hereby corrected as shown below:

Columns 23 thru 26 should be deleted and substituted with the attached Columns 23 thru 26 and to include additional Columns 27 & 28.

Signed and Sealed this

Thirteenth Day of December 1977

[SEAL]

Attest:

RUTH C. MASON        LUTRELLE F. PARKER
*Attesting Officer*     *Acting Commissioner of Patents and Trademarks* states, whereby the signal appearing on its Q output line will unlatch relay 290 and thereby terminate the reverse wind operation. Turbine 220 operates at a relatively slow speed in the reverse direction so that relay 290 will unlatch and thereby stop the reverse wind operation while the sensed Cue tone section is over the splicing block assembly, with the result that on subsequent operation of programmer No. 1, the cutter will sever the supply tape at the sensed Cue tone section. Except for responding to the Cue tone signal, the control system otherwise will operate in the same manner as when it is set to respond to the output of tape counter 232.

Obviously the apparatus may be modified in various ways without departing from the principles of the invention. Thus, for example, cam 249D and switch 252D may be omitted and instead the input side of cassette counter 237 may be connected to switch 252E or F or switch 250J. Similarly, the two electromechanical programmers may be replaced by a digital electronic control system. Still other changes will be obvious to persons skilled in the art.

I claim:

1. An apparatus for automatically loading a plurality of cassettes having two rotatable spools and a leader attached to said spools with a predetermined length of tape comprising in combination:
   cassette holding means for releasably holding a cassette to be loaded in a predetermined loading position;
   means for storing a plurality of cassettes to be loaded and for advancing them one at a time to said loading position;
   means for feeding a supply of tape to be loaded;
   a splicing block means spaced from said loading position for supporting a portion of the tape to be loaded and the leader of a cassette located at said loading position;
   reciprocally movable leader extractor means for withdrawing the leader from a cassette located at said loading position and positioning said leader on said splicing block means, said leader extractor means comprising a leader extractor member which is movable relative to said splicing block means toward and away from said loading position;
   splicing means for alternately splicing a leading end of said tape to one section of a severed leader positioned on said splicing block means and a trailing end of said tape to a second section of a severed leader positioned on said splicing block means;
   rotatable drive means for rotating a spool of a cassette located at said loading position to wind a predetermined length of said tape on said spool;
   cutting means for (a) severing a leader supported on the splicing block means into two sections and (b) severing said tape after a predetermined length thereof has been wound; and
   means for controlling operation of the foregoing means to effectuate the sequential loading of a plurality of cassettes.

2. Apparatus according to claim 1 wherein said cassette holding means holds a cassette in a selected plane, and said storage means comprises a stationary magazine for containing a plurality of cassettes to be loaded, said magazine having a discharge opening at its bottom end and being arranged so that the bottommost cassette therein is disposed substantially in said selected plane.

3. Apparatus according to claim 2 wherein said loading position is located below said discharge opening.

4. Apparatus according to claim 3 further including means for ejecting a loaded cassette from said loading position.

5. Apparatus according to claim 3 including a panel supporting said magazine, and further wherein said cassette holding means is movable relative to said panel.

6. Apparatus according to claim 3 wherein said splicing block means is located below and to one side of said magazine, and said leader extractor member is mounted for movement between a first position in which it is located to one side of said splicing block means and a second position in which it is located adjacent to a cassette that is held at said loading position.

7. Apparatus according to claim 1 wherein said leader extractor member comprises a finger portion having a cavity for receiving a leader, and said leader extractor means further comprises (a) means for coupling said cavity to a vacuum source to create a suction force to act upon a leader in a manner such as to cause the leader to be sucked into said cavity and held to said finger portion by suction, and (b) means supporting said leader extractor member for movement to and from said loading position.

8. Apparatus according to claim 7 wherein said means supporting said leader extractor member comprises at least one rail on which said leader extractor member is slidable.

9. Apparatus according to claim 8 further including means for reciprocating said leader extractor member on said at least one rail.

10. Apparatus according to claim 7 including means for selectively terminating said suction force.

11. Apparatus according to claim 7 wherein said finger portion is located in the same plane as a cassette located at said loading position.

12. An apparatus for automatically loading a plurality of cassettes having two rotatable spools and a leader attached to said spools with a predetermined length of tape comprising in combination:
   cassette holding means for releasably holding a cassette to be loaded in a predetermined loading position;
   means for storing a plurality of cassettes to be loaded and for advancing them one at a time to said loading position, said means for storing a plurality of cassettes to be loaded and for advancing them one at a time to said loading position comprising a magazine for holding a plurality of cassettes to be loaded and cassette guide means for receiving cassettes one at a time from said magazine and guiding them to said loading position;
   means for feeding a supply of tape to be loaded;
   a splicing block means spaced from said loading position for supporting the leading end of the tape to be loaded and the leader of a cassette located at said loading position;
   reciprocally movable leader extractor means for withdrawing the leader from a cassette located at said loading position and positioning said leader on said splicing block means;
   splicing means for (a) splicing a leading end of said tape to one section of a severed leader positioned on said splicing block means, and (b) splicing a trailing end of said tape to a second section of a severed leader positioned on said splicing block means;

rotatable drive means for rotating the spool of a cassette located at said loading position to wind a predetermined length of said tape on said spool;

cutting means for (a) severing a leader supported on the splicing block means into two sections and (b) severing the tape after a predetermined length thereof has been wound; and means for controlling operation of the foregoing means to effectuate the sequential loading of a plurality of cassettes.

13. Apparatus according to claim 12 wherein said means for storing a plurality of cassettes to be loaded and for advancing them one at a time to said loading position comprises means for selectively stopping cassettes from moving from said magazine to said guide means.

14. Apparatus according to claim 1 wherein said rotatable drive means comprises a drive spindle adapted to make a driving connection with a cassette spool, means for rotating said spindle, and means for shifting said spindle into and out of driving connection with the spool of a cassette located at said loading position.

15. Apparatus according to claim 12 wherein said guide means is located above said cassette holding means and comprises a pair of guides defining a channel for receiving cassettes from said magazine and directing them to said loading position.

16. Apparatus according to claim 15 wherein the length of said channel is sufficient for at least two cassettes to be disposed between said cassette holding means and the discharge end of said magazine.

17. Apparatus according to claim 16 further including means for advancing cassettes between said pair of guides to said loading position.

18. Apparatus according to claim 16 wherein said cassette holding means comprises a pair of spring clips extending below said guides.

19. Apparatus according to claim 16 wherein said means for advancing cassettes between said pair of guides is disposed adjacent to the discharge end of said magazine.

20. Apparatus according to claim 16 wherein said means for advancing cassettes between said pair of guides is adapted to move cassettes located between said pair of guides toward said cassette holding means.

21. Apparatus according to claim 16 further including means for promoting discharge of a loaded cassette from said loading position at a faster rate than cassettes are advanced along said channel from said magazine.

22. Apparatus according to claim 1 wherein said leader extractor member is adapted to move back and forth over said splicing block means.

23. Apparatus according to claim 22 including means for controlling movement of said leader extractor member in timed relation to advancement of a cassette to said loading position.

24. Apparatus according to claim 1 wherein said means for storing a plurality of cassettes to be loaded and for advancing them one at a time to said loading position comprises (a) a cassette storage magazine having a cassette discharge opening arranged so that cassettes are oriented vertically as they are discharged therefrom and (b) means for engaging a cassette discharged from said magazine and propelling the same downward to said cassette holding means.

25. Apparatus according to claim 1 wherein said cassette holding means comprises a pair of movable members adapted for intercepting and releasing cassettes advanced to said loading position.

26. Apparatus according to claim 1 wherein said splicing block means comprises a stationary block and a movable block, said stationary block having a first guide track for receiving a first section of said leader, and said movable block having a second guide track for receiving the tape to be loaded and a third guide track for receiving a second section of said leader.

27. Apparatus according to claim 26 wherein said movable block is movable to alternately shift one or the other of said second and third guide tracks into alignment with said first guide track and further including means for selectively applying vacuum to said first, second and third guide tracks.

28. Apparatus according to claim 27 including means for selectively applying vacuum to said first, second and third guide tracks.

29. Apparatus according to claim 27 wherein said leader extractor member is disposed so as to position the extracted leader along said first and second guide tracks when said first and second guide tracks are aligned with one another.

30. In combination with a machine for loading a selected supply tape into a cassette which included a tape leader, said machine having cassette holding means for holding the cassette to be loaded, a splicing block assembly for supporting the leading end of the supply tape and the leader of the cassette to be loaded, and means for sequentially (a) severing the leader on the splicing block assembly into first and second leader sections, (b) splicing said first leader section to the leading end of the supply tape, (c) winding the first leader section and a predetermined length of the supply tape which is connected thereto into the cassette held by the cassette holding means, (d) severing said supply tape at said splicing block assembly so as to form a trailing end for said predetermined length of supply tape, and (e) splicing said trailing end to the second leader section, the improvement comprising a leader extractor mechanism which includes a leader extractor member which is adapted for reciprocal movement past said splicing block assembly toward and away from a cassette held by said cassette holding means, means for connecting said leader extractor member to a source of vacuum, and means for reciprocally moving said leader extractor member so that the leader is withdrawn from said cassette by suction and positioned on said splicing block assembly as said leader extractor member is reciprocated toward and away from said cassette.

31. Apparatus according to claim 29 further including means for disconnecting said leader extractor member from said source of vacuum after said leader has been positioned on said splicing block assembly.

32. A leader extractor mechanism for withdrawing a leader from a tape cassette located at a selected loading position and positioning said leader on a splicing block assembly comprising, a carriage movable back and forth along a selected path, a hollow member carried by said carriage and having an opening for accommodating a leader tape, and means for removing air from said hollow member so as to create a suction force at said opening for holding a tape leader to said member.

33. Apparatus according to claim 32 including means for moving said carriage back and forth along said path.

34. Apparatus according to claim 32 for terminating removal of air from said member when said carriage is in a selected position.

35. Method for automatically loading a cassette with a selected supply tape comprising the following steps:
advancing the cassette to be loaded from a magazine to a selected loading position, withdrawing the leader from the cassette by a movable suction device and moving the suction device with the leader so as to position the withdrawn leader upon a splicing block assembly which is at a fixed location spaced from said loading position, severing the leader on the splicing block assembly into first and second leader sections, attaching said first leader section to the leading end of a supply tape of indefinite length, winding said first leader section and the supply tape attached thereto into said cassette, terminating winding, severing said supply tape at a selected point so as to form a trailing end for the supply tape wound into the cassette, splicing said trailing end to the second leader section, winding said trailing end and said second leader section into said cassette, discharging said cassette from said loading position and replacing it with a second cassette, and automatically repeating the foregoing steps in order to effect loading of said second cassette.

36. A method according to claim 35 further including the step of reversing movement of said supply tape after winding has been terminated just long enough to remove any slack from said supply tape, and thereafter performing the steps of severing the supply tape and splicing it to the second leader section as previously described.

37. The method according to claim 35 wherein said suction device comprises a hollow member and said leader is extracted from said cassette and positioned on said splicing block assembly by sucking the leader into an opening in said hollow member under the influence of vacuum and moving said hollow member over and past said splicing block assembly.

38. A method according to claim 37 wherein the vacuum applied to said hollow member is relieved after said leader has been positioned on said splicing block assembly.

39. Apparatus for loading magnetic tape into a cassette having two rotatable hubs and a leader tape having its ends connected to said hubs, said apparatus comprising:
means for rotatably supporting a roll of magnetic tape;
means for releasably supporting said cassette at a selected loading position;
splicing block means spaced from said loading position for releasably supporting a portion of the leader tape extracted from said cassette and also the leading end of said magnetic tape;
leader extractor means movable between said splicing block means and said loading position for withdrawing the leader from a cassette located at said loading position and positioning a portion of said leader on said splicing block means, said leader extractor means comprising a hollow leader extractor member movable between said splicing block means and said loading position, means for moving said leader extractor member back and forth between said splicing block means and said loading position, and means for removing air from said hollow leader extractor member so as to produce a suction force for sucking a leader into said hollow extractor member;
tape slitting means;
tape-splicing means; and
means for (a) operating said tape-slitting means to slit said leader tape portion and thereby form first and second hub-connected leaders; (b) operating said splicing means to splice said first leader to the leading end of said magnetic tape; (c) rotating the hub to which said first leader is attached so as to wind a quantity of said magnetic tape thereon; (d) terminating rotation of the said hub and further operating said tape-slitting means to slit said magnetic tape at a point spaced from said cassette; and (e) further operating said splicing means to splice the trailing end of the magnetic tape wound on the said hub to said second leader.

* * * * *

UNITED STATES PATENT OFFICE
CERTIFICATE OF CORRECTION

Patent No. 3,997,123  Dated December 14, 1976

Inventor(s) James L. King

It is certified that error appears in the above-identified patent and that said Letters Patent are hereby corrected as shown below:

Claim 28 should be deleted.

Claim 30, (Column 26, line 29, "included" should read -- includes --.

Signed and Sealed this

Twenty-seventh Day of June 1978

[SEAL]

Attest:

RUTH C. MASON
Attesting Officer

DONALD W. BANNER
Commissioner of Patents and Trademarks